US009097921B2

(12) United States Patent
Ogasawara et al.

(10) Patent No.: US 9,097,921 B2
(45) Date of Patent: Aug. 4, 2015

(54) ACTIVE MATRIX DISPLAY DEVICE

(75) Inventors: Isao Ogasawara, Osaka (JP); Masahiro Yoshida, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 45 days.

(21) Appl. No.: 14/232,407

(22) PCT Filed: Jul. 9, 2012

(86) PCT No.: PCT/JP2012/067449
§ 371 (c)(1),
(2), (4) Date: Jan. 13, 2014

(87) PCT Pub. No.: WO2013/011855
PCT Pub. Date: Jan. 24, 2013

(65) Prior Publication Data
US 2014/0132873 A1 May 15, 2014

(30) Foreign Application Priority Data
Jul. 15, 2011 (JP) .................... 2011-156601

(51) Int. Cl.
*G02F 1/1345* (2006.01)
*G02F 1/13* (2006.01)
*G02F 1/1333* (2006.01)
*G02F 1/133* (2006.01)

(52) U.S. Cl.
CPC .......... *G02F 1/1309* (2013.01); *G02F 1/13452* (2013.01); *G02F 1/13306* (2013.01); *G02F 2001/13456* (2013.01); *G02F 2201/506* (2013.01); *G02F 2201/508* (2013.01)

(58) Field of Classification Search
CPC .............. G02F 1/1309; G02F 1/13306; G02F 1/13452; G02F 2001/13456
USPC ....................... 349/54–55, 149, 151–152, 192
See application file for complete search history.

(56) References Cited

U.S. PATENT DOCUMENTS 7,995,184 B2 * 8/2011 Kim et al. ..................... 349/192
2005/0195338 A1 * 9/2005 Matsumoto et al. ............. 349/40

FOREIGN PATENT DOCUMENTS

| JP | 2003-222895 A | 8/2003 |
| JP | 2005-249993 A | 9/2005 |
| WO | 2013/021992 A1 | 2/2013 |

OTHER PUBLICATIONS

U.S. Appl. No. 14/237,511, filed on Feb. 6, 2014.

* cited by examiner

*Primary Examiner* — Nathanael R Briggs
(74) *Attorney, Agent, or Firm* — Chen Yoshimura LLP

(57) ABSTRACT

An active matrix display device has: a first auxiliary wiring line (700); a second auxiliary wiring line (710) positioned outside of a plurality of second lead-out wiring lines (250) and a first driver circuit in a plan view; and an external auxiliary wiring line (790). Along each of a plurality of connecting wirings (900) are disconnected portions (91) inhibiting electrical connections between a plurality of transmission terminals and first common wiring lines (130). A plurality of intersections (901), where the first auxiliary wiring line (700) and the plurality of connecting wirings (900) intersect, are positioned more to the side of the plurality of transmission terminals than to the disconnected portions (91) in each of the plurality of connecting wiring lines (900).

16 Claims, 12 Drawing Sheets

ACTIVE MATRIX DISPLAY DEVICE

TECHNICAL FIELD

The present invention relates to an active matrix display device.

BACKGROUND ART

Among liquid crystal display devices, which are active matrix display devices, devices including auxiliary wiring lines are disclosed in the Related Art Documents of Japanese Patent Application Laid-Open Publication No. 2003-222895 (Patent Document 1) and Japanese Patent Application Laid-Open Publication No. 2005-249993 (Patent Document 2).

The liquid crystal display device disclosed in Patent Document 1 includes auxiliary wiring lines for repairing defects in the display region, the auxiliary wiring lines passing between input and output terminals in the IC mounting portion. The liquid crystal display device is also provided with through terminals, which are constituted of input terminals and output terminals electrically connected to each other in the IC, which drives the active matrix elements. Furthermore, the auxiliary wiring lines are connected to the output side of the through terminals, and collective pixel lines connected to respective RGB rows and used during image testing are connected to the input side of the through terminals.

Before mounting the IC that drives the active matrix elements, the collective pixel lines are cut by a laser or the like. After mounting the IC that drives the active matrix elements, the circuit is constituted only of wiring lines connected to the through terminals.

In the active matrix display device disclosed in Patent Document 2, inter-terminal shorting wiring lines that connect input wiring lines to the TFTs and wiring lines on the FPC (flexible printed circuit) substrate are cut by laser irradiation. If there are input wiring lines to TFTs with wiring disconnection defects, the cut inter-terminal shorting wiring lines are repaired with a metal complex, or the repair is conducted by skipping some of the inter-terminal shorting wiring lines between input terminals and cutting the other inter-terminal shorting wiring lines between input terminals.

RELATED ART DOCUMENTS

Patent Documents

Patent Document 1: Japanese Patent Application Laid-Open Publication No. 2003-222895
Patent Document 2: Japanese Patent Application Laid-Open Publication No. 2005-249993

SUMMARY OF THE INVENTION

Problems to be Solved by the Invention

In the liquid crystal display device disclosed in Patent Document 1, paths corresponding to through terminals and terminals have to be formed in drivers such as mounted ICs. In the active matrix display device disclosed in Patent Document 2, repairs need to be conducted either by skipping the wiring lines when performing laser irradiation or by using a metal complex, which means that a complex repair method is required.

The present invention takes into account the above-mentioned problems, and an object thereof is to provide an active matrix display device in which it is possible to perform repairs in a simple manner and to simplify the configuration of the drivers to be mounted.

Means for Solving the Problems

An active matrix display device of the present invention includes an active matrix substrate, a driver mounted on the active matrix substrate, and an external substrate electrically connected to the active matrix substrate. The active matrix substrate has a plurality of first wiring lines that extend in parallel with each other in at least a display region, and a plurality of second wiring lines that extend in parallel with each other in the display region, and that intersect with the plurality of first wiring lines across an insulating film. Also, the active matrix substrate has a plurality of first transmission terminals located in a terminal region towards the display region, the terminal region being located outside the display region on one end of the plurality of first wiring lines, the plurality of first transmission terminals being aligned in an extension direction of the plurality of second wiring lines and sending signals from the driver to the respective plurality of first wiring lines. Also, the active matrix substrate has a plurality of first lead-out wiring lines that respectively connect one end of the plurality of first wiring lines to the plurality of first transmission terminals, and a plurality of second lead-out wiring lines connected to one end of at least some of the plurality of second wiring lines. Also, the active matrix substrate has a first driver circuit that is electrically connected to the plurality of second lead-out wiring lines, and that supplies signals to the at least some of the plurality of second wiring lines, and a plurality of output terminals that output a signal to the driver, located in the terminal region, on the side thereof opposite to the display region. Also, the active matrix substrate has a group of terminals located in the terminal region closer to an edge thereof opposite to where the display region is located than the plurality of output terminals, the group of terminals including a plurality of input terminals to which a signal from the external substrate is inputted, and a first common wiring line terminal included in the group of terminals by which a signal is inputted, the signal passing through the plurality of first transmission terminals. Also, the active matrix substrate has a first common wiring line connected to the first common wiring line terminal, the first common wiring line having an extension portion that extends between the plurality of first transmission terminals and the plurality of output terminals so as to separate the plurality of first transmission terminals from the plurality of output terminals, and a plurality of connecting wiring lines provided between the respective plurality of first transmission terminals and the extension portion of the first common wiring line. Also, the active matrix substrate has a second auxiliary wiring line that intersects with any of a plurality of redundant portions that are portions on another end of the plurality of first wiring lines opposite to the one end of the plurality of first wiring lines across the insulating film and that are located outside of the display region, the second auxiliary wiring line being located outside of where the plurality of second lead-out lines and the first driver circuit are located in a plan view, the second auxiliary wiring line being able to be electrically connected to any of input terminals included in the group of terminals. The external substrate has an external auxiliary wiring line that connects the first common wiring line terminal to an input terminal that can be connected to the second auxiliary wiring line among the plurality of input terminals included in the group of terminals. The plurality of connecting wiring lines respectively have obstructing portions therein that obstruct electrical connections between the plurality of first transmission terminals and the first common wiring line. A plurality of intersections where the first auxiliary wiring line and the plurality of connecting wiring lines intersect are located in each of the plurality of connecting wiring lines closer to the plurality of first transmission terminals than the obstructing portions are.

In one embodiment of the present invention, the active matrix substrate further includes a plurality of third lead-out wiring lines connected to another end opposite to the one end thereof of at least some of the remaining plurality of second wiring lines that are not connected to the plurality of second lead-out wiring lines; a second driver circuit that is electrically connected to the plurality of third lead-out wiring lines, and that supplies signals to the at least some of the remaining plurality of second wiring lines; and a third auxiliary wiring line that intersects with any of the plurality of redundant portions across the insulating film, the third auxiliary wiring line being located outside of where the plurality of third lead-out wiring lines and the second driver circuit are located in a plan view, the third auxiliary wiring line being able to be electrically connected to any of the input terminals included in the group of terminals. The external substrate further includes an external auxiliary wiring line that connects the first common wiring line terminal to an input terminal that can be connected to the third auxiliary wiring line among the plurality of input terminals included in the group of terminals.

In one embodiment of the present invention, the active matrix substrate has a plurality of the first common wiring line terminals and a plurality of the first common wiring lines. The plurality of first common wiring line are respectively connected to the first common wiring line terminal, the first common wiring line having an extension portion that extends between the plurality of first transmission terminals and the plurality of output terminals so as to separate the plurality of first transmission terminals from the plurality of output terminals.

In one embodiment of the present invention, the active matrix substrate has a plurality of the first auxiliary wiring lines.

An active matrix substrate of an embodiment of the present invention further includes a plurality of second transmission terminals located in a terminal region towards the display region, the terminal region being located outside the display region on one end of the plurality of first wiring lines, the plurality of second transmission terminals being aligned in an extension direction of the plurality of second wiring lines and sending signals from the driver to the respective plurality of first wiring lines, and
a second common wiring line by which a signal is inputted, the signal passing through the plurality of second transmission terminals connected to the plurality of second lead-out wiring lines among the plurality of second transmission terminals. The second auxiliary wiring line is connected to the second common wiring line or intersects therewith across the insulating film.

In one embodiment of the present invention, the obstructive portion is configured by providing a disconnected portion in each of the plurality of connecting wiring lines.

In one embodiment of the present invention, the obstructive portion is configured by providing a switching element in each of the plurality of connecting wiring lines.

In one embodiment of the present invention, three first common wiring line terminals are provided. Three of the first common wiring lines respectively connected to the three first common wiring line terminals are provided. The plurality of first wiring lines are electrically connected to any of the three first common wiring lines.

In one embodiment of the present invention, the first driver circuit is monolithically formed on the active matrix substrate.

In one embodiment of the present invention, the connecting wiring line connected to a first wiring line having a disconnection among the plurality of first wiring lines is electrically connected to the first auxiliary wiring line that intersects with the connecting wiring line by removing a portion of the insulating film interposed therebetween. The first auxiliary wiring line electrically connected to the connecting wiring line is electrically connected to the first common wiring line that intersects with the first auxiliary wiring line by removing a portion of the insulating film interposed therebetween. The first common wiring line terminal connected to the first common wiring line that is electrically connected to the first auxiliary wiring line is connected by the external auxiliary wiring line to any of the input terminals included in the group of terminals. An input terminal connected by the external auxiliary wiring line to the first common wiring line terminal is connected to the second auxiliary wiring line. The second auxiliary wiring line electrically connected to the first common wiring line terminal is electrically connected to any of the plurality of redundant portions by removing a portion of the insulating film interposed therebetween. A signal from the driver inputted from the first transmission terminals is sent to both one end and another end of the first wiring line among the plurality of first wiring lines that is electrically connected to the connecting wiring line connected to the first auxiliary wiring line.

An active matrix substrate of an embodiment of the present invention further includes: a plurality of third lead-out wiring lines connected to another end of at least some of the remaining plurality of second wiring lines that are not connected to the plurality of second lead-out wiring lines; a second driver circuit connected to the plurality of third lead-out wiring lines; a third auxiliary wiring line that intersects with any of the plurality of redundant portions across the insulating film, the third auxiliary wiring line being located outside of where the plurality of third lead-out wiring lines and the second driver circuit are located in a plan view, the third auxiliary wiring line being able to be electrically connected to any of the input terminals included in the group of terminals; a plurality of second transmission terminals located in a terminal region towards the display region, the terminal region being located outside the display region on one end of the plurality of first wiring lines, the plurality of second transmission terminals being aligned in an extension direction of the plurality of second wiring lines and sending signals from the driver to the respective plurality of first wiring lines; and a third common wiring line by which a signal is inputted, the signal passing through the plurality of second transmission terminals connected to the plurality of third lead-out wiring lines among the plurality of second transmission terminals. The external substrate further includes an external auxiliary wiring line that connects the first common wiring line terminal to an input terminal that can connect to the third auxiliary wiring line among the plurality of input terminals included in the group of terminals. The third auxiliary wiring line is connected to the third common wiring line or intersects therewith across the insulating film.

In one embodiment of the present invention, the external substrate has a plurality of the external auxiliary wiring lines. The plurality of external auxiliary wiring lines can be connected respectively to a plurality of the first common wiring line terminals. The active matrix substrate includes in the group of terminals a plurality of input terminals that can connect the plurality of first common wiring line terminals that can be respectively connected to the plurality of external auxiliary wiring lines to at least one of the second auxiliary wiring line and the third auxiliary wiring line.

In one embodiment of the present invention, the connecting wiring line connected to a first wiring line having a disconnection among the plurality of first wiring lines is electrically connected to the first auxiliary wiring line that intersects with the connecting wiring line by removing a portion of the insulating film interposed therebetween. The first auxiliary wiring line electrically connected to the connecting wiring line is electrically connected to the first common wiring line that intersects with the first auxiliary wiring line by removing a portion of the insulating film interposed therebetween. The first common wiring line terminal connected to the first common wiring line that is electrically connected to the first auxiliary wiring line is connected by the external auxiliary wiring line to any of the input terminals included in the group of terminals. A terminal connected to the first common wiring line terminal by the external auxiliary wiring line is connected to the second auxiliary wiring line or the third auxiliary wiring line. The second auxiliary wiring line or the third auxiliary wiring line electrically connected to the first common wiring line terminal is electrically connected to any of the plurality of redundant portions by removing a portion of the insulating film interposed therebetween. A signal from the driver inputted from the first transmission terminals is sent to both one end and another end of the first wiring line among the plurality of first wiring lines that is electrically connected to the connecting wiring line connected to the first auxiliary wiring line.

In one embodiment of the present invention, the second driver circuit is monolithically formed on the active matrix substrate.

In one embodiment of the present invention, at least one of the first driver circuit and the second driver circuit is formed in the driver.

In one embodiment of the present invention, the second auxiliary wiring line and the third auxiliary wiring line are connected to the plurality of redundant portions so as not to overlap the plurality of redundant portions or intersects with the plurality of redundant portions.

Effects of the Invention

According to the present invention, it is possible to perform repairs in a simple manner and to simplify the configuration of the drivers to be mounted.

DETAILED DESCRIPTION OF EMBODIMENT

Figure 1:
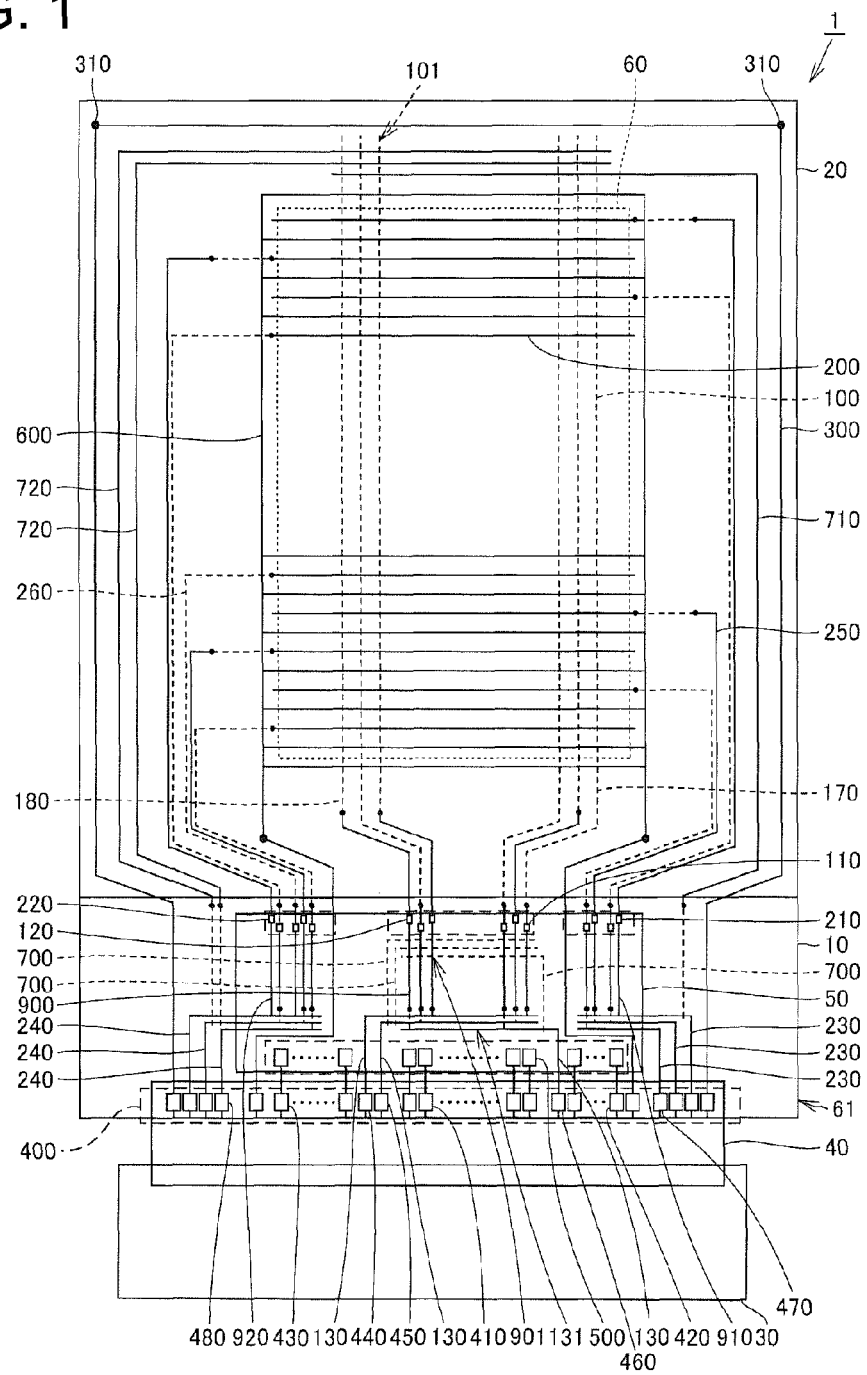
FIG. 1 is a plan view showing a configuration of an active matrix display device according to Embodiment 1 of the present invention.

Below, an active matrix display device of Embodiment 1 of the present invention will be explained. In the descriptions for embodiments below, identical or corresponding portions in the respective drawings are given the same reference characters, and descriptions thereof will not be repeated. In the explanations of the embodiments, the expressions up, down, left, and right are used for convenience of explanation, but these expressions are based on the figures that are shown and do not limit the configurations of the present invention.

Also, in the embodiments below, a liquid crystal panel is described as an example of a display panel included in the active matrix display device, but the present invention can be applied to a display device other than a liquid crystal panel such as a microcapsule electrophoretic electronic paper, organic EL (electroluminescence) display, and an inorganic EL display.

(Embodiment 1)

FIG. 1 is a plan view showing a configuration of an active matrix display device according to Embodiment 1 of the present invention. In FIG. 1, wiring lines formed in the gate electrode layer of the TFTs are depicted with solid lines, and wiring lines formed in the source/drain electrode layer of the TFTs are depicted with dotted lines. In the state shown in FIG. 1, obstructing portions to be mentioned later are not formed.

As shown in FIG. 1, the active matrix display device 1 according to the present embodiment includes an active matrix substrate 10, and an opposite substrate 20 facing the active matrix substrate 10. A liquid crystal material that is not shown is sandwiched between the active matrix substrate 10 and the opposite substrate 20.

The active matrix display device 1 includes a driver 50 mounted on the active matrix substrate 10, and an FPC 40 and a circuit substrate 30, which are external substrates electrically connected to the active matrix substrate 10.

In the active matrix display device 1 of the present embodiment, the active matrix substrate 10 and the circuit substrate 30 are electrically connected through the FPC 40, but if the external auxiliary wiring lines are formed only on either one of the FPC 40 and the circuit substrate 30, then the active matrix display device 1 is connected only to whichever of the FPC 40 and the circuit substrate 30 has the external auxiliary wiring lines formed thereon.

In the opposite substrate 20 of the present embodiment, a color filter layer including R (red), G (green), and B (blue) color filters and a black matrix that prevents light leakage between these color filters are formed. A common electrode is formed on the color filter layer.

The active matrix substrate 10 is provided with a display region 60 located substantially in the center of the active matrix substrate 10, and a terminal region 61 located towards the bottom of FIG. 1 in which a plurality of input terminals are disposed. The terminal region 61 is a region of the active matrix substrate 10 that does not face the opposite substrate 20 when the active matrix substrate 10 and the opposite substrate 20 are bonded together with the liquid crystal material, which is not shown, therebetween.

The active matrix substrate 10 is provided with a plurality of source wiring lines 100 that are first wiring lines extending in parallel with each other at least in the display region 60, and a plurality of gate wiring lines 200 that are second wiring lines that intersect with the plurality of source wiring lines 100 across an insulating film. The insulating film is made of a material such as $SiN_x$ or $SiO_x$.

FIG. 1 shows only some of the plurality of source wiring lines 100 and plurality of gate wiring lines 200. The number of source wiring lines 100 and the number of gate wiring lines 200 are respectively set appropriately.

In the present embodiment, the plurality of source wiring lines 100 are formed for each color RGB in the display region 60. In other words, in the display region 60, there are source wiring lines 100 for R, source wiring lines 100 for G, and source wiring lines 100 for B. However, the configuration is not limited thereto in the case of monochrome liquid crystal panels.

Besides the plurality of source wiring lines 100 and the plurality of gate wiring lines 200, the display region 60 also has formed therein storage capacitance wiring lines. The storage capacitance wiring lines are formed in the display region 60 so as to be parallel to the plurality of gate wiring lines 200.

Switching elements such as TFTs or MIMs (metal insulator metal) that are not shown, and pixel electrodes (R, G, or B), which are not shown, connected to these switching elements, are respectively formed in the intersections of the plurality of source wiring lines 100 and the plurality of gate wiring lines 200.

The terminal region 61 is located outside of the display region 60, on one end (lower side in drawing) of the plurality of source wiring lines 100. The display region 60 side of the terminal region 61 is provided with a plurality of right-side source terminals 110 and a plurality of left-side source terminals 120 that are a plurality of first transmission terminals that respectively send signals from the driver 50 to the plurality of source wiring lines 100. The plurality of right-side source terminals 110 and the plurality of left-side source terminals 120 are aligned in the extension direction of the plurality of wiring lines 200.

In order to connect the driver 50 to the terminal region 61, it is possible to use the COG (chip on glass) method. The driver 50 is provided with a first driver circuit and a second driver circuit that supply a signal to the gate wiring lines 200. However, the form of the first driver circuit and the second driver circuit is not limited thereto, and at least one of them may be formed monolithically on the active matrix substrate 10.

Also, the display region 60 side of the terminal region 61 is provided with a plurality of right-side gate terminals 210 and a plurality of left-side gate terminals 220 that are a plurality of second transmission terminals that respectively send a signal from the driver 50 to the plurality of gate wiring lines 200. The plurality of right-side gate terminals 210 and the plurality of left-side source terminals 220 are aligned in the extension direction of the plurality of gate wiring lines 200.

The plurality of right-side source terminals 110 and plurality of left-side source terminals 120, and one end of the plurality of source wiring lines 100 are respectively connected to each other by a plurality of right-side first lead-out wiring lines 170 and a plurality of left-side first lead-out wiring lines 180 that are a plurality of first lead-out wiring lines. For ease of explanation, the right-side source terminals 110 and the left-side source terminals 120 are described as separate parts, but the right-side source terminals 110 and the left-side source terminals 120 are functionally the same type of terminal.

Specifically, the plurality of right-side source terminals 110 and the plurality of source wiring lines 100 are connected through the plurality of right-side first lead-out wiring lines 170 such that one right-side source terminal 110 corresponds one-to-one to one source wiring line 100.

Also, the plurality of left-side source terminals 120 and the plurality of source wiring lines 100 are connected through the plurality of left-side first lead-out wiring lines 180 such that one right-side source terminal 120 corresponds one-to-one to one source wiring line 100.

The plurality of right-side gate terminals 210 and one end of some of the plurality of gate wiring lines 200 are respectively connected to each other through a plurality of second lead-out wiring lines 250. The plurality of left-side gate terminals 220 and the other end of the remainder of the plurality of gate wiring lines 200 not connected to the plurality of right-side second lead-out wiring lines 250 are respectively connected to each other through a plurality of third lead-out wiring lines 260.

In the present embodiment, some of the plurality of gate wiring lines 200 and the remainder of the plurality of gate wiring lines 200 are formed alternately and parallel to each other. However, the connective configuration of the gate wiring lines and the lead-out wiring lines is not limited thereto, and a configuration may be used in which some of the plurality of gate wiring lines 200 are in the upper half of the display region 60, and the remainder of the plurality of gate wiring lines 200 are in the lower half of the display region 60, for example.

The plurality of right-side gate terminals 210 and the plurality of gate wiring lines 200 are connected to each other through the plurality of second lead-out wiring lines 250 such that one right-side gate terminal 210 corresponds to one gate wiring line 200.

Also, the plurality of left-side gate terminals 220 and the plurality of gate wiring lines 200 are connected to each other through the plurality of third lead-out wiring lines 260 such that one left-side gate terminal 220 corresponds to one gate wiring line 200.

A plurality of output terminals 500 that output a signal to the driver 50 are provided in the terminal region 61, on the side thereof opposite to the display region 60. The plurality of output terminals 500 are aligned in the extension direction of the plurality of gate wiring lines 200.

A group of terminals 400 including a plurality of input terminals 410 that input signals from the FPC 40 or the circuit substrate 30 is provided in the terminal region 61, on the side thereof opposite to the display region 60 when viewed from the plurality of output terminals 500. The plurality of input terminals 410 are aligned in the extension direction of the plurality of gate wiring lines 200.

The group of terminals 400 includes a plurality of first common wiring line terminals 440, 450, and 460 for inputting a signal through the plurality of right-side source terminals 110 and the plurality of left-side source terminals 120.

Specifically, the first common wiring line terminal 440, the first common wiring line terminal 450, the plurality of input terminals 410, and the first common wiring line terminal 460 are provided in that order from the left of FIG. 1.

The group of terminals 400 includes a plurality of second common wiring line terminals 470 for inputting a signal through the plurality of second lead-out wiring lines 250. Furthermore, the group of terminals 400 includes a plurality of third common wiring line terminals 480 for inputting a signal through the plurality of third lead-out wiring lines 260.

The plurality of first common wiring line terminals 440, 450, and 460 are respectively connected to the plurality of first common wiring lines 130. Each of the plurality of first common wiring lines 130 has an extension portion 131 that extends so as to separate a plurality of right-side source terminals 110 and a plurality of left-side source terminals 120 from the plurality of output terminals 500.

The plurality of second common wiring line terminals 470 are respectively connected to the plurality of second common wiring lines 230. Each of the plurality of second common wiring lines 230 has an extension portion that extends between the right-side gate terminals 210 and the plurality of output terminals 500 so as to separate them.

The plurality of third common wiring line terminals 480 are respectively connected to the plurality of third common wiring lines 240. Each of the plurality of third common wiring lines 240 has an extension portion that extends between the left-side gate terminals 220 and the plurality of output terminals 500 so as to separate them.

Also, the group of terminals 400 includes a plurality of input terminals 410, 420, and 430 respectively connected to the plurality of output terminals 500.

Figure 2:
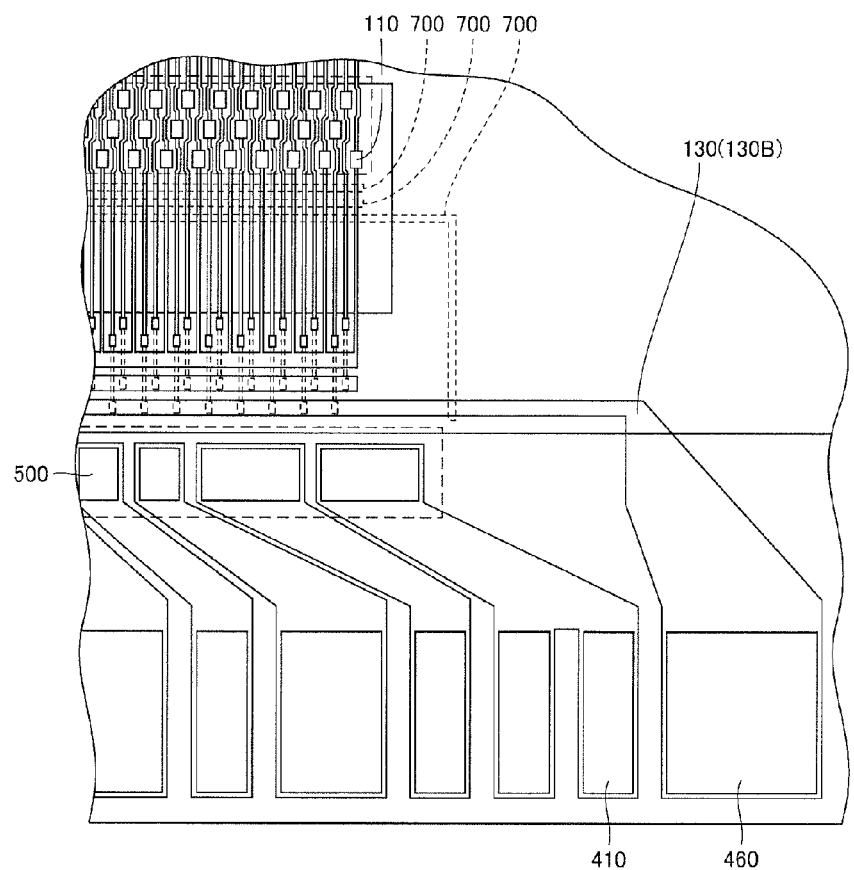
FIG. 2 is a partial magnified view showing a blue subpixel common wiring line among first common wiring lines in the active matrix display device of the same embodiment.
Figure 3:
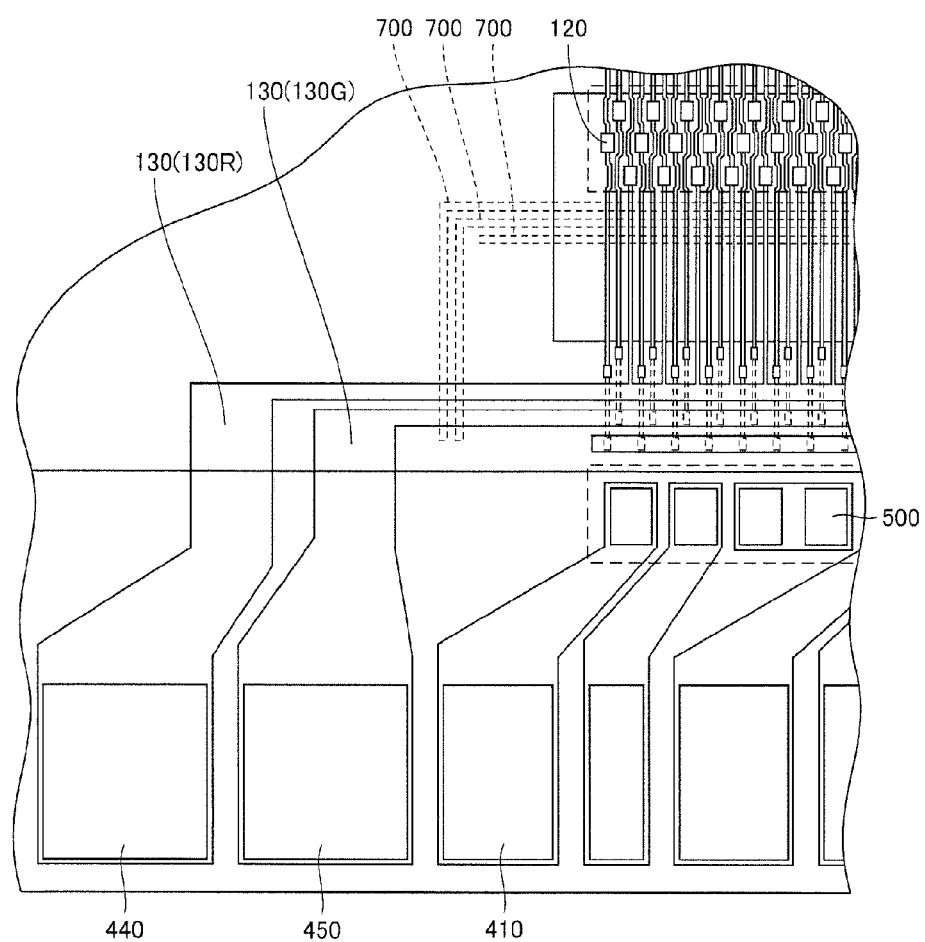
FIG. 3 is a partial magnified view showing a red subpixel common wiring line and a green subpixel common wiring line among first common wiring lines in the active matrix display device of the same embodiment.

FIG. 2 is a partial magnified view showing a blue subpixel common wiring line among first common wiring lines in the active matrix display device of the present embodiment. FIG. 3 is a partial magnified view showing a red subpixel common wiring line and a green subpixel common wiring line among first common wiring lines in the active matrix display device of the present embodiment.

As shown in FIGS. 1 to 3, in the present embodiment, three first common wiring lines 130 are provided, and the plurality of first common wiring line terminals 440, 450, and 460 are respectively connected to one first common wiring line 130.

Specifically, a red subpixel common wiring line 130R is connected to the first common wiring line terminal 440. A green subpixel common wiring line 130G is connected to the first common wiring line terminal 450. A blue subpixel common wiring line 130B is connected to the first common wiring line terminal 460.

Three second common wiring lines 230 are provided and the three second common wiring line terminals 470 are respectively connected to one second common wiring line 230. Three third common wiring lines 240 are provided and the three third common wiring line terminals 480 are respectively connected to one third common wiring line 240.

Between the respective plurality of right-side source terminals 110 and plurality of left-side source terminals 120, and the extension portions 131 of the plurality of first common wiring lines 130, a plurality of first connecting wiring lines 900 that are a plurality of connecting wiring lines are provided. During image scanning of the display region 60, the plurality of first connecting wiring lines 900 and the plurality of first common wiring lines 130 are electrically connected.

Between the respective plurality of right-side gate terminals 210, and the extension portions of the plurality of second common wiring lines 230, a plurality of second connecting wiring lines 910 that are a plurality of connecting wiring lines are provided. During image scanning of the display region 60, the plurality of second connecting wiring lines 910 and the plurality of second common wiring lines 230 are electrically connected.

Between the respective plurality of left-side gate terminals 220, and the extension portions of the plurality of third common wiring lines 240, a plurality of third connecting wiring lines 920 that are a plurality of connecting wiring lines are provided. During image scanning of the display region 60, the plurality of third connecting wiring lines 920 and the plurality of third common wiring lines 240 are electrically connected.

In the present embodiment, three first connecting wiring lines 900 that are respectively connected to three right-side source terminals 110 are respectively connected to different first common wiring lines 130. The three first connecting wiring lines 900 that are respectively connected to the three left-side source terminals 120 are respectively connected to different first common wiring lines 130.

The three first common wiring lines 130, after extending in the extension direction of the plurality of source wiring lines 100 from the three connected first common wiring line terminals 440, 450, and 460, change direction so as to extend in the extension direction of the plurality of gate wiring lines 200.

The three second connecting wiring lines 910 that are respectively connected to the three right-side gate terminals 210 are respectively connected to different second common wiring lines 230. The three third connecting wiring lines 920 that are respectively connected to the three left-side gate terminals 220 are respectively connected to different third common wiring lines 240.

The three second common wiring lines 230, after extending in the extension direction of the plurality of source wiring lines 100 from the three connected second common wiring line terminals 470, change direction so as to extend in the extension direction of the plurality of gate wiring lines 200.

The three third common wiring lines 240, after extending in the extension direction of the plurality of source wiring lines 100 from the three connected third common wiring line terminals 480, change direction so as to extend in the extension direction of the plurality of gate wiring lines 200.

Between the plurality of right-side source terminals 110 and plurality of left-side source terminals 120 and the plurality of output terminals 500, first auxiliary wiring lines 700 that intersect with the first common wiring lines 130 through an insulating film and that intersect with the plurality of first connecting wiring lines 900 through an insulating film are provided. The insulating film is made of the same material as the gate insulating film and is made of a material such as $SiN_x$ or $SiO_x$, for example.

In the present embodiment, three first auxiliary wiring lines 700 are provided, and the three first auxiliary wiring lines 700, after extending in the extension direction of the plurality of source wiring lines 100 from the respective extension portions 131 of the three first common wiring lines 130 that intersect therewith, change direction and extend in the extension direction of the plurality of gate wiring lines 200.

The plurality of source wiring lines 100 have a plurality of redundant portions 101 that are portions on the other end of the respective source wiring lines 100, and that are located outside of the display region 60. The active matrix substrate 10 has formed thereon a second auxiliary wiring line 710 that intersects with any of the plurality of redundant portions 101 through an insulating film, that is located outside of the path that electrically connects the plurality of second lead-out wiring lines 250 to any of the input terminals included in the group of terminals 400, and that can be electrically connected to any of the input terminals included in the group of terminals 400. In other words, the second auxiliary wiring line 710 is located outside of the plurality of second lead-out wiring lines 250 and the first driver circuit in a plan view.

In the present embodiment, the second auxiliary wiring lines 710 intersect with one second common wiring line 230 through an insulating film. The second auxiliary wiring line 710 intersects with redundant portions 101 of all source wiring lines 100 through an insulating film.

Also, the active matrix substrate 10 has formed thereon third auxiliary wiring lines 720 that intersect with any of the plurality of redundant portions 101 through an insulating film, that are located outside of the path that electrically connects the plurality of third lead-out wiring lines 260 to any of the input terminals included in the group of terminals 400, and that can be electrically connected to any of the input terminals included in the group of terminals 400. In other words, the third auxiliary wiring lines 720 are located outside of the plurality of third lead-out wiring lines 260 and the second driver circuit in a plan view.

In the present embodiment, two of the third auxiliary wiring lines 720 respectively intersect with two of the third common wiring lines 240 through an insulating film. Also, each of the two third auxiliary wiring lines 720 intersects with the redundant portions 101 of all source wiring lines 100 through an insulating film.

An auxiliary capacitance wiring line 600 is provided so as to surround the display region 60. One end of the auxiliary capacitance wiring line 600 is electrically connected to one input terminal among the group of terminals 400. The other end of the auxiliary capacitance wiring line 600 is electrically connected to another input terminal among the group of terminals 400.

A common electrode wiring line 300 is provided so as to surround the second auxiliary wiring line 710 and the third auxiliary wiring lines 720. Common electrode terminals included in the group of terminals 400 are connected to the common electrode wiring line 300. Transfer pads 310 are also connected to the common electrode wiring line 300.

The transfer pads 310 are connected to a common electrode, which is not shown, formed on the opposite substrate 20. In this manner, a common voltage can be applied to the common electrode formed on the opposite substrate 20 from common electrode terminals. The common electrode does not necessarily need to be provided on the opposite substrate 20, and in a liquid crystal device using transverse electric fields, the common electrode is provided on the active matrix substrate 10.

A method of manufacturing a liquid crystal panel of the active matrix display device of the present embodiment will be described below. A step of testing to test the electrical connective state of the liquid crystal panel will be described in detail below.

First, on a transparent glass substrate, thin films such as a conductive film, an insulating film, a protective film, and an alignment film are stacked, and a base substrate for a plurality of active matrix substrates to be formed is made, the base substrate having active matrix substrate regions for active matrix substrates 10 to be cut out.

Next, on a transparent glass substrate, thin films such as a black matrix, color filters, a conductive film, and an alignment film are stacked, and a base substrate for a plurality of opposite substrates to be formed is made, the base substrate having opposite substrate regions for opposite substrates 20 to be cut out. A sealing material is coated onto one of the base substrates among the two base substrates. Then, after the sealing material has been coated, the two base substrates are bonded to each other.

The base substrates that have been bonded together are cut out as a motherboard from which a prescribed number of liquid crystal panels, each having an active matrix substrate 10 and an opposite substrate 20, are formed. In other words, the liquid crystal panel shown in FIG. 1 is one of the liquid crystal panels that have been cut from the motherboard after the liquid crystal material was injected. Therefore, other liquid crystal panels are present on the left and right of the liquid crystal panel of FIG. 1, for example, although they are not shown.

In each of the liquid crystal panels cut from the motherboard, the liquid crystal material is injected by vacuum injection, for example, through an injection hole formed between the active matrix substrate 10 and the opposite substrate 20. Drip injection may be used to inject the liquid crystal material instead of vacuum injection. In such a case, there is neither a need for an injection hole, nor a step of sealing the injection hole portion.

Before attaching the driver 50 to the terminal region 61, a step of testing for testing the electrical connective state of the liquid crystal panel is performed. In the step of testing, testing is performed for disconnections in wiring lines, shorting, defects in pixel electrodes or the like in the active matrix substrate 10 of the liquid crystal panel.

As a testing method, a testing probe is put into contact respectively with the plurality of first common wiring line terminals 440, 450, and 460, the plurality of second common wiring line terminals 470, and the plurality of third common wiring line terminals 480, for example, and a prescribed voltage is applied. There is no special limitation for the order in which the testing probe is put into contact with the plurality of first common wiring line terminals 440, 450, and 460, the plurality of second common wiring line terminals 470, and the plurality of third common wiring line terminals 480.

In this manner, a test signal that functions as a scanning signal is inputted to the respective plurality of gate wiring lines 200. The test signal is a signal that turns ON switching elements of respective subpixels for a prescribed period of time. Also, a test signal functioning as a source signal is inputted to the respective plurality of source wiring lines 100. This test signal is a signal that causes liquid crystal around each subpixel region to be oriented in a desired direction.

In this manner, the switching elements of the respective subpixels are turned ON, and by having the test signal functioning as a source signal inputted to the respective pixel electrodes and a common signal inputted to the common electrode, a prescribed voltage is applied to the liquid crystal layer, thereby controlling the orientation direction of the liquid crystal molecules. When light from an illumination device such as a backlight is then radiated from the rear of the liquid crystal panel, for example, an image is displayed in a display screen of the liquid crystal panel corresponding to the display region 60 of the active matrix substrate 10.

Therefore, by visual inspection by an inspector, for example, of the display screen of the liquid crystal panel, it is possible to detect disconnections and shorting of wiring lines in the active matrix substrate 10 of the liquid crystal panel. An image detection device may be used in addition to or instead of visual inspection by an inspector, or a testing device that detects disconnections or shorting in the wiring lines electrically may be used.

Figure 4:
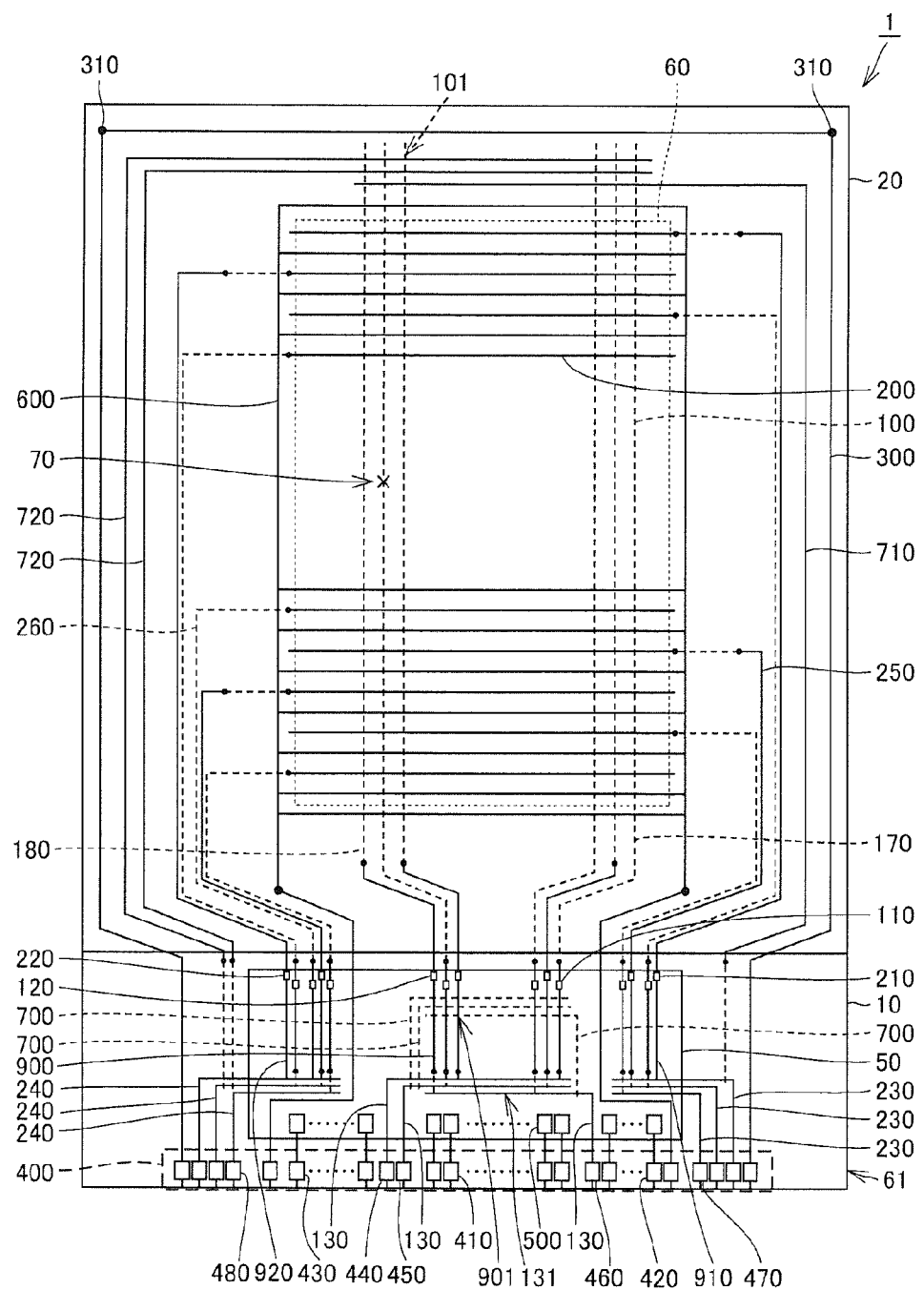
FIG. 4 is a plan view showing a state in which there is a disconnection in a source wiring line in a liquid crystal panel of the active matrix display device of the same embodiment.
Figure 5:
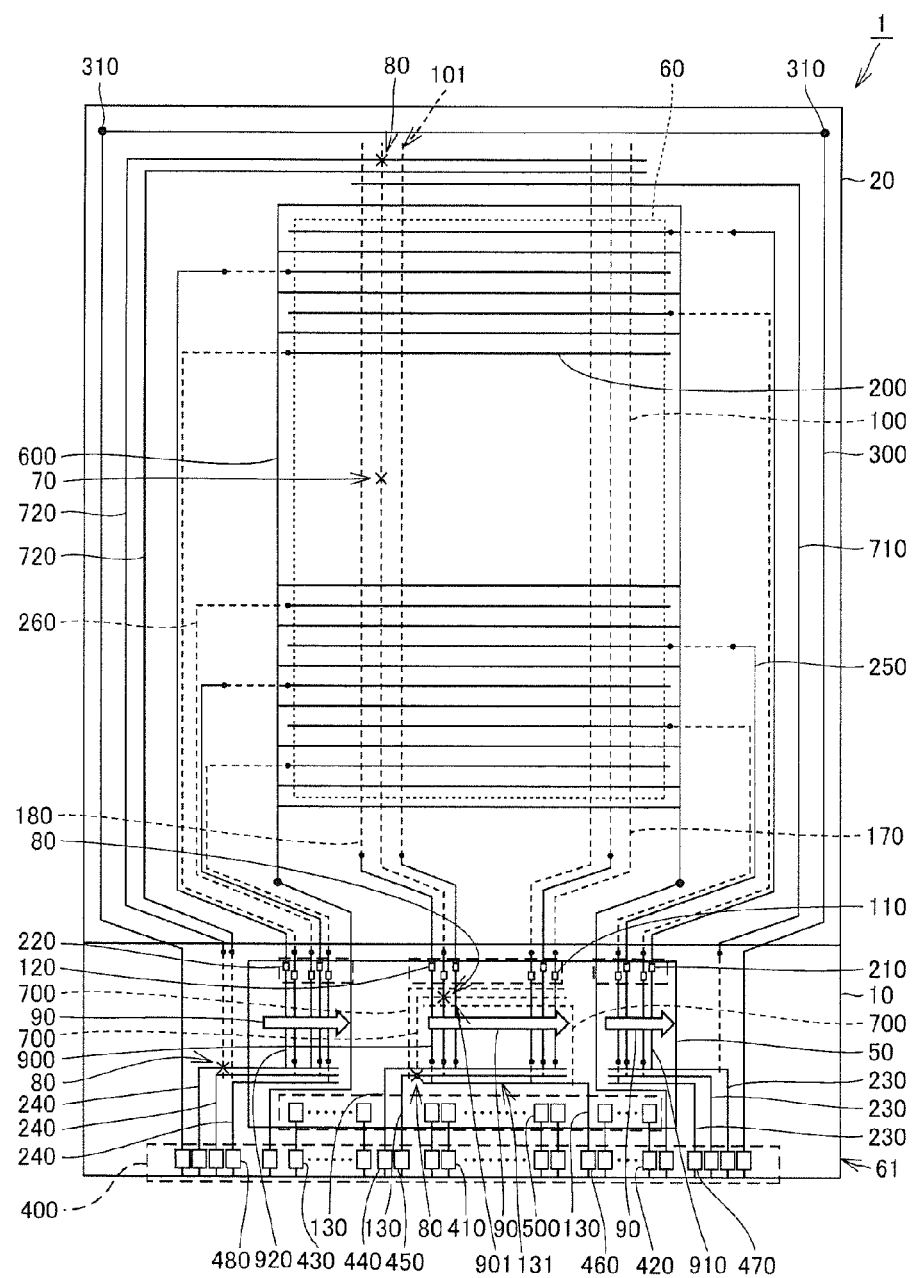
FIG. 5 is a plan view showing a state in which a laser beam is radiated on the liquid crystal panel of the active matrix display device of the same embodiment.
Figure 6:
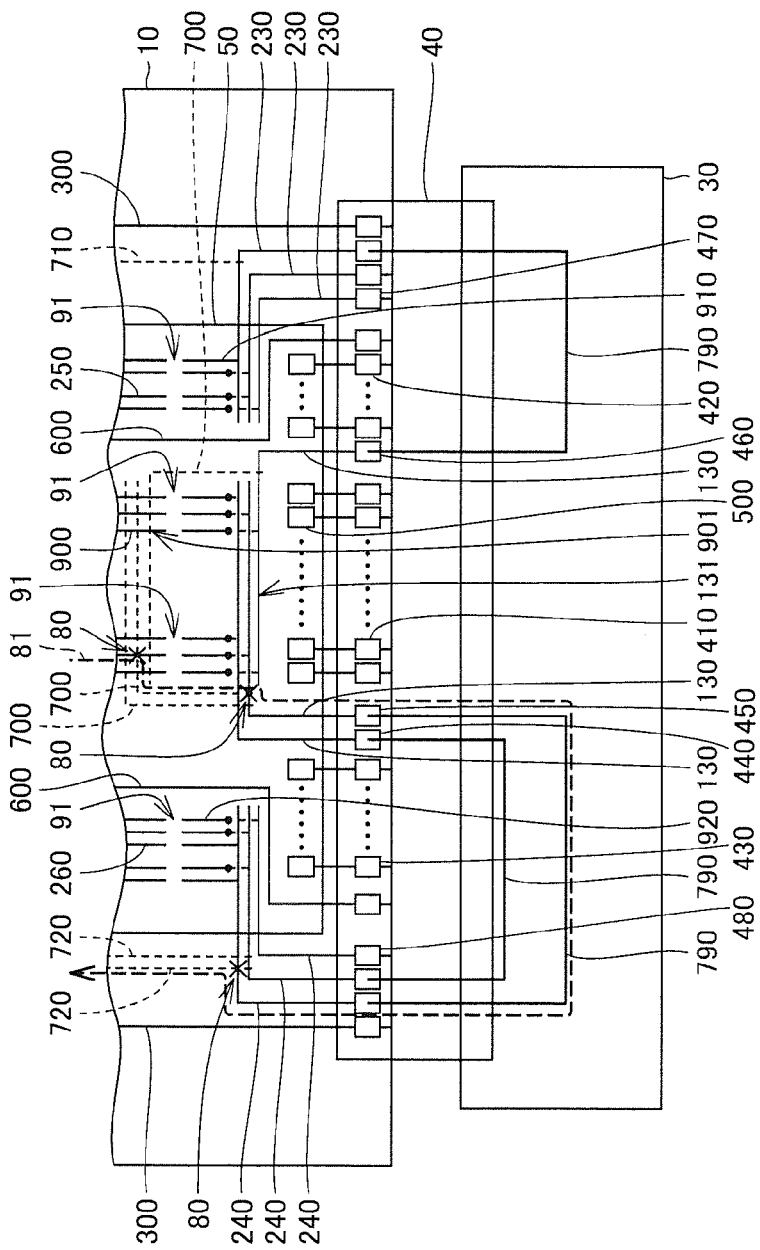
FIG. 6 is a plan view showing an example of a repair path constituted of an auxiliary wiring line after the laser beam was radiated on the liquid crystal panel of the active matrix display device of the same embodiment.

FIG. 4 is a plan view showing a state in which there is a disconnection in a source wiring line in a liquid crystal panel of the active matrix display device of the present embodiment. FIG. 5 is a plan view showing a state in which a laser beam is radiated on the liquid crystal panel of the active matrix display device of the present embodiment. FIG. 6 is a plan view showing an example of a repair path constituted of an auxiliary wiring line after the laser beam was radiated on the liquid crystal panel of the active matrix display device of the present embodiment.

As shown in FIG. 4, if a disconnection 70 is present in one source wiring line 100, then no test signal flows in the source wiring line 100 beyond the disconnection 70 (top portion in drawing) even if a test signal is inputted by putting a testing probe or the like in contact with the first common wiring line terminal 450.

In this case, a step of repair is performed in which is laser beam is radiated to perform a repair. As shown in FIG. 5, a laser beam is radiated onto a target 80, which is an intersection between the first auxiliary wiring line 700 that is electrically connected to the source wiring line 100 having the disconnection 70, and the first connecting wiring line 900. By radiating a laser beam onto the target 80, the insulating film interposed therebetween is removed, and the first auxiliary wiring line 700 and the first connecting wiring line 900 are melted together and consequently connected to each other electrically.

Similarly, a laser beam is radiated onto a target 80 that is an intersection between the first auxiliary wiring line 700 that is electrically connected to the first connecting wiring line 900, and the first common wiring line 130. By radiating a laser beam onto the target 80, the insulating film interposed therebetween is removed, and the first auxiliary wiring line 700 and the first common wiring line 130 are melted together and consequently connected to each other electrically.

As shown in FIG. 6, the FPC 40 and the circuit substrate 30 have external auxiliary wiring lines 790 that connect any of the plurality of common wiring line terminals 440, 450, and 460 to a terminal that is electrically connected to any of the plurality of second lead-out wiring lines 250 and plurality of third lead-out wiring lines 260 among the plurality of input terminals included in the group of terminals 400.

In the present embodiment, the first common wiring line 130 that is electrically connected to the first auxiliary wiring line 700 is connected to the first common wiring line terminal 450. A laser beam is radiated to a target 80 that is an intersection between the third common wiring line 240 that is electrically connected to the first common wiring line terminal 450 through the external auxiliary wiring line 790, and the third auxiliary wiring line 720. By radiating a laser beam onto the target 80, the insulating film interposed therebetween is removed, and the third common wiring line 240 and the third auxiliary wiring line 720 are melted together and consequently connected to each other electrically.

A laser beam is radiated on a target 80 that is an intersection between the third auxiliary wiring line 720 that is electrically connected to the first common wiring line terminal 450, and the redundant portion 101 of the source wiring line 100. By radiating a laser beam onto the target 80, the insulating film interposed therebetween is removed, and the third auxiliary wiring line 720 and the redundant portion 101 of the source wiring line 100 are melted together and consequently connected to each other electrically.

By radiating a laser beam onto the four targets 80 in this manner, a test signal inputted from the first common wiring line terminal 450 is sent to one end and the other end of the source wiring line 100 having the disconnection 70.

As a result, after the driver 50 is mounted, the signal from the driver 50 inputted from the left-side source terminal 120 is sent to one end and the other end of the source wiring line 100 having the disconnection 70.

This step of repair can be performed in the same step as trimming or turning pixels into dark spots, which are steps for repairing pixel defects, and no special addition of a step is required.

After the step of testing is finished, a step of cutting in which the plurality of first connecting wiring lines 900, the plurality of second connecting wiring lines 910, and the plurality of third connecting wiring lines 920 are cut. In the present embodiment, the step of cutting is performed after the step of repair, but the step of cutting may be performed before the step of repair but after the step of testing.

In the step of cutting, a laser beam is radiated along a line in the direction shown in the arrow 90 of FIG. 5, thereby cutting the plurality of first connecting wiring lines 900, the plurality of second connecting wiring lines 910, and the plurality of third connecting wiring lines 920.

In this manner, the plurality of right-side source terminals 110 and the plurality of first common wiring lines 130 are no longer electrically connected. The plurality of left-side source terminals 120 and the plurality of first common wiring lines 130 are no longer electrically connected. The plurality of right-side gate terminals 210 and the plurality of second common wiring lines 230 are no longer electrically connected. The plurality of left-side gate terminals 220 and the plurality of third common wiring lines 240 are no longer electrically connected.

As a result, the respective plurality of first connecting wiring lines 900 have, in the middle of them, disconnected portions 91 that are obstructing portions that obstruct the electrical connection between the plurality of right-side source terminals 110 and plurality of left-side source terminals 120, and the plurality of first common wiring lines 130.

Similarly, the respective plurality of second connecting wiring lines 910 have, in the middle of them, disconnected portions 91 that are obstructing portions that obstruct the electrical connection between the plurality of right-side gate terminals 210, and the plurality of second common wiring lines 230. The respective plurality of third connecting wiring lines 920 have, in the middle of them, disconnected portions 91 that are obstructing portions that obstruct the electrical connection between the plurality of left-side gate terminals 220, and the plurality of third common wiring lines 240.

A plurality of intersections 901 where the first auxiliary wiring lines 700 and the first connecting wiring lines 900 intersect are located at each of the plurality of first connecting wiring lines 900 on the side of the disconnected portions 91 closer to the plurality of right-side source terminals 110 and plurality of left-side source terminals 120.

After the step of cutting is finished, individual liquid crystal panels are cut out from the motherboard. After an optical film such as a polarizing plate is attached to the cut out liquid crystal panel, a step of mounting is performed in which the driver 50, which controls the driving of the plurality of source wiring lines 100 and the plurality of gate wiring lines 200, is mounted on terminal region 61.

In this manner, the liquid crystal panel is manufactured. The method of manufacturing the liquid crystal panel is not limited to the method above. For example, in a monochrome liquid crystal panel, color filters do not have to be formed on the opposite substrate 20. Also, a step of testing and a step of mounting may be performed after the individual liquid crystal panels are cut out.

According to the above-mentioned configuration, the electrical connection between the first auxiliary wiring lines 700 and the first connecting wiring lines 900 is maintained even if all first connecting wiring lines 900, second connecting wiring lines 910, and third connecting wiring lines 920 are cut by radiating a laser beam along a line in the direction of the arrow 90 in FIG. 5.

As a result, it is not necessary to skip wiring lines to be cut by laser during the step of cutting, and thus, repair can be performed with ease. Also, by effectively using some of the first connecting wiring lines 900 as some repair paths after cutting, there is no need to form a path connecting the input and output terminals in the mounted driver 50, and thus, the configuration of the mounted driver 50 can be simplified. Additionally, by effectively using the common wiring lines and the common wiring line terminals used as input paths for the testing signals as some repair paths, it is possible to mitigate an increase in width for the FPC.

In the active matrix substrate 10 of the present embodiment, repair paths are constituted of the plurality of first auxiliary wiring lines 700, the plurality of second auxiliary wiring lines 710, the plurality of third auxiliary wiring lines 720, and the plurality of external auxiliary wiring lines 790.

Thus, the second lead-out wiring lines 250 and the third lead-out wiring lines 260 do not intersect with the repair paths. Thus, the load capacity of the repair paths can be reduced, and waveform rounding in the signals flowing through the repair paths can be reduced.

Furthermore, the plurality of first auxiliary wiring lines 700 are provided in the mounting region of the terminal region 61 where the driver 50 is mounted, and thus, there is no need to separately provide a space for the plurality of first auxiliary wiring lines 700, and it is possible to mitigate an increase in size of the liquid crystal panel.

The active matrix display device 1 may have a configuration in which the source wiring lines 100 and the gate wiring lines 200 are switched. In the present embodiment, both second lead-out wiring lines 250 and third lead-out wiring lines 260 are provided but a configuration may be used in which only one of them is provided.

In the present embodiment, three first auxiliary wiring lines 700 respectively corresponding to the three first common wiring lines 130 are provided, but as long as there is at least one first common wiring line 130 present, the number of first auxiliary wiring lines 700 does not necessarily need to be the same as the number of first common wiring lines 130.

Furthermore, by connecting an amplifier to the external auxiliary wiring lines 790 formed in the FPC 40 and the circuit substrate 30, the output of the signal flowing through the repair path can be strengthened. Thus, weakening of the signal output as a result of the repair path being long can be compensated, thus allowing a reliable repair to be performed.

Also, the plurality of lead-out wiring lines on the active matrix substrate 10 sandwich an insulating layer, and are divided into a gate layer and a source/drain layer. Thus, compared to a case in which all wiring lines are formed in the same layer, it is possible to decrease the space between lead-out wiring lines adjacent to each other in a plan view. Thus, it is possible to reduce the area where the lead-out wiring lines are disposed on the active matrix substrate 10, and thus, it is possible to reduce the size of the active matrix display device 1.

The present invention can also be used for objects other than repairing disconnections. For example, the present invention can be used for wiring resistance management and defect analysis in the process of manufacturing the panel. When calculating wiring resistance and confirming a signal outputted from the driver, it is possible to calculate the wiring resistance or the signal outputted from the driver with ease by bringing a probe into contact with a common wiring line terminal in a state in which a specific auxiliary wiring line is in contact therewith.

Also, by connecting the plurality of gate wiring lines or the plurality of source wiring lines to the common wiring lines through connecting wiring lines, it is possible to perform anti-static measures by dissipating a buildup of charge in the gate wiring lines and the source wiring lines.

Also, the active matrix display device of the present embodiment is not limited to one in which a step of repair has been performed, but also includes ones in which a step of repair has not been performed.

Below, an active matrix display device of Embodiment 2 of the present invention will be explained. In the description of the embodiment below, descriptions of configurations similar to Embodiment 1 will be omitted.

(Embodiment 2)

Figure 7:
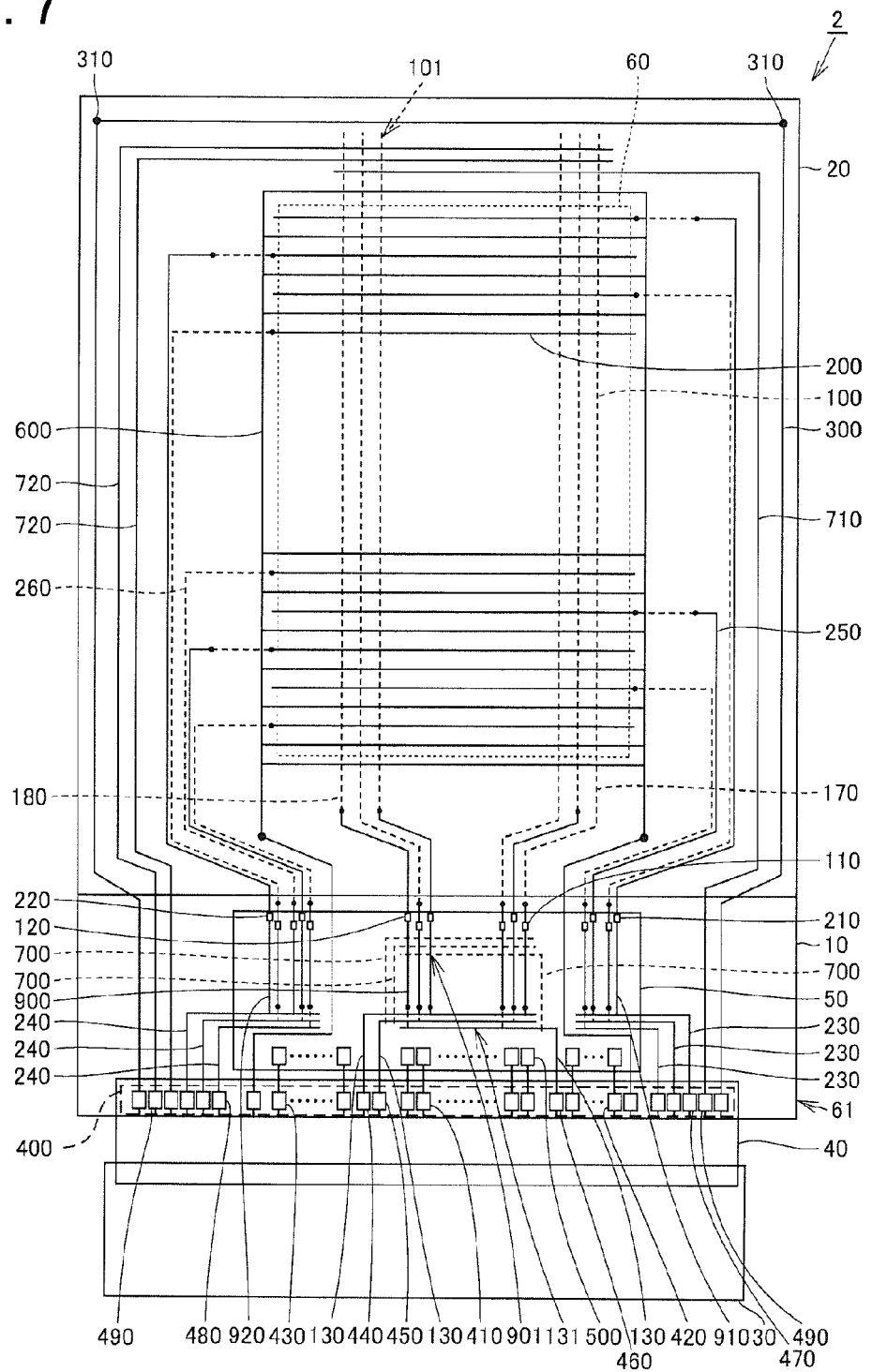
FIG. 7 is a plan view showing a configuration of an active matrix display device according to Embodiment 2 of the present invention.

FIG. 7 is a plan view showing a configuration of an active matrix display device according to Embodiment 2 of the present invention. In FIG. 7, wiring lines formed in the gate electrode layer of the TFTs are depicted with solid lines, and wiring lines formed in the source/drain electrode layer of the TFTs are depicted with dotted lines. FIG. 7 shows a state prior to forming obstructing portions. The obstructing portions are formed in a location similar to that of the active matrix display device 1 of Embodiment 1.

As shown in FIG. 7, in an active matrix display device 2 of the present embodiment, second auxiliary wiring lines 710 and third auxiliary wiring lines 720 are respectively connected to a plurality of auxiliary wiring line terminals 490 included in a group of terminals 400.

Figure 8:
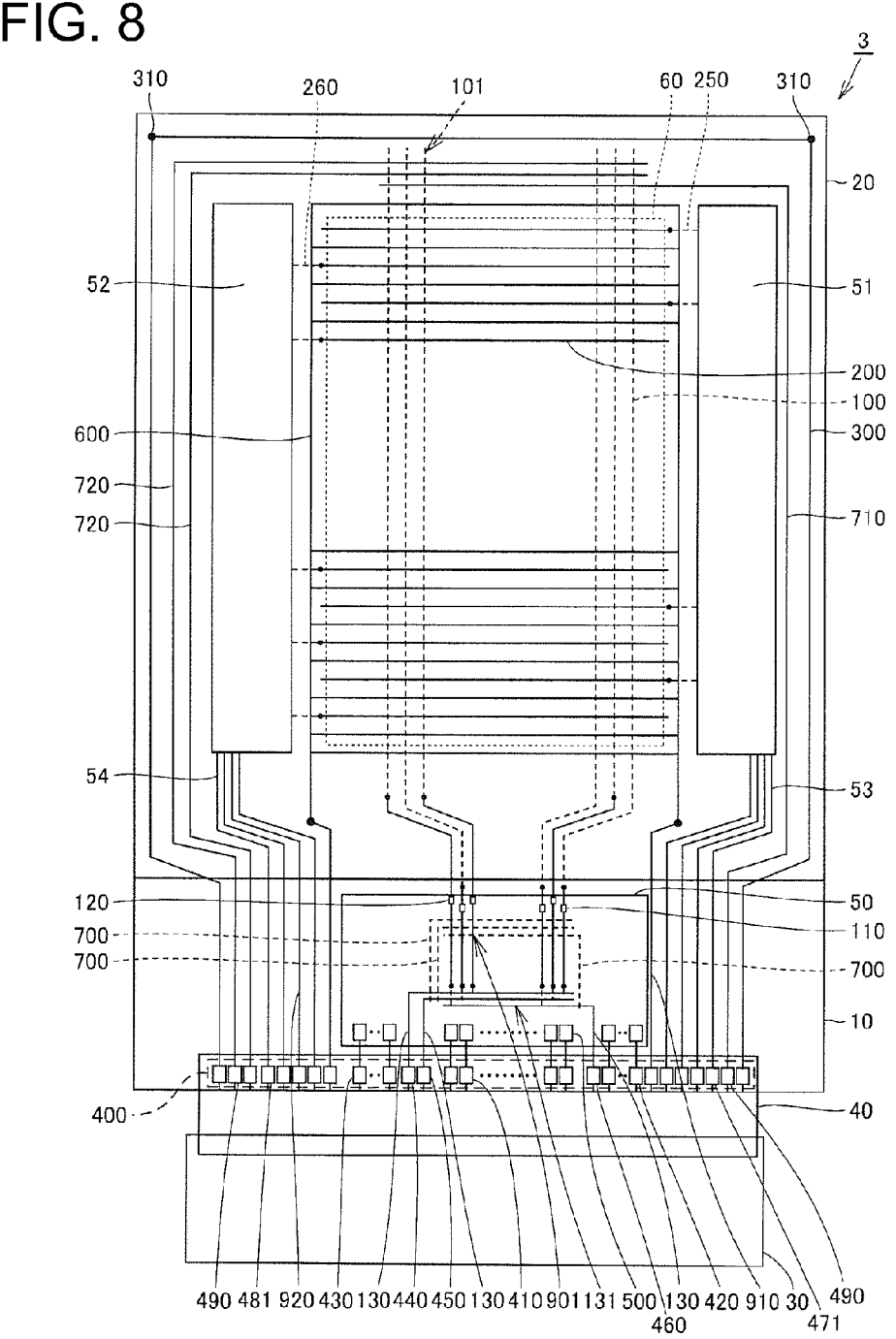
FIG. 8 is a plan view showing a configuration of an active matrix display device according to a modification example of the same embodiment.

FIG. 8 is a plan view showing a configuration of an active matrix display device according to a modification example of the present embodiment. In FIG. 8, wiring lines formed in the gate electrode layer of the TFTs are depicted with solid lines, and wiring lines formed in the source/drain electrode layer of the TFTs are depicted with dotted lines. FIG. 8 shows a state prior to forming obstructing portions. The obstructing portions are formed in a location similar to that of the active matrix display device 1 of Embodiment 1.

As shown in FIG. 8, in an active matrix display device 3 according to a modification example of the present embodiment, a right-side driver circuit 51, which is a first driver circuit that drives a plurality of gate wiring lines 200, and a left-side driver circuit 52, which is a second driver circuit, are formed monolithically on the active matrix substrate 10.

The right-side driver circuit 51 is provided outside and to the right of the display region 60 and is connected to the plurality of second lead-out wiring lines 250. The right-side driver circuit 51 includes shift registers having connected thereto unit circuits including signal output parts that output signals to the second lead-out wiring lines 250, and a right-side trunk wiring line for supplying a clock signal, a low potential signal, or the like to each shift register. The right-side trunk wiring line and the right-side driver circuit signal wiring lines 53 are connected to each other. The right-side driver circuit signal wiring lines 53 are connected to any of input terminals 471 included in the group of terminals 400.

The left-side driver circuit 52 is provided outside and to the left of the display region 60 and is connected to the plurality of third lead-out wiring lines 260. The left-side driver circuit 52 includes shift registers having connected thereto unit circuits including signal output parts that output signals to the third lead-out wiring lines 260, and a left-side trunk wiring line for supplying a clock signal, a low potential signal, or the like to each shift register. The left-side trunk wiring line and the left-side driver circuit signal wiring lines 54 are connected to each other. The left-side driver circuit signal wiring lines 54 are connected to any of input terminals 481 included in the group of terminals 400.

A clock signal, a low potential signal, an initialization signal, and the like, which are supplied from the FPC 40 or the circuit substrate 30, are inputted to terminals connected to the right-side driver circuit signal wiring lines 53 and the left-side driver signal wiring lines 54.

In the active matrix display device 3 of the modification example of the present embodiment, in the step of testing, the gate driver is driven by putting a probe or the like into contact with terminals connected to the right-side driver circuit signal wiring lines 53 and the left-side driver circuit signal wiring lines 54. Thus, the second common wiring lines 230 and the third common wiring lines 240 do not need to be provided as in the active matrix display device 1 of Embodiment 1.

In the present modification example, the right-side driver circuit 51 and the left-side driver circuit 52 are disposed further to the interior than the second auxiliary wiring lines 710 and the third auxiliary wiring lines 720, and thus, the right-side driver circuit signal wiring lines 53 and the left-side driver circuit signal wiring lines 54 do not intersect with the repair paths. Thus, the load capacity of the repair paths can be reduced, and waveform rounding in the signals flowing through the repair paths can be reduced.

Below, an active matrix display device of Embodiment 3 of the present invention will be explained. In the description of the embodiment below, descriptions of configurations similar to Embodiment 1 will be omitted.

(Embodiment 3)

Figure 9:
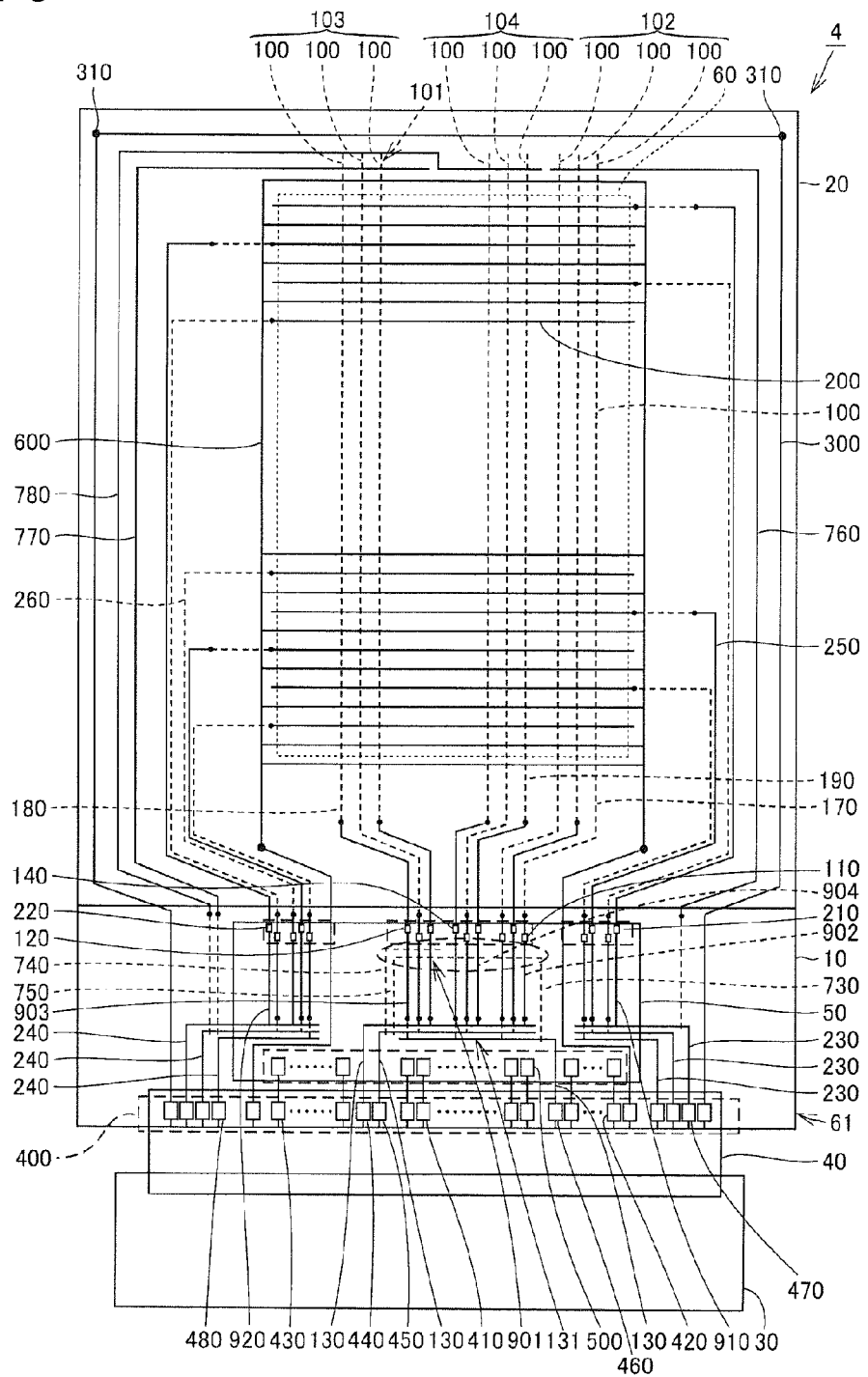
FIG. 9 is a plan view showing a configuration of an active matrix display device according to Embodiment 3 of the present invention.
Figure 10:
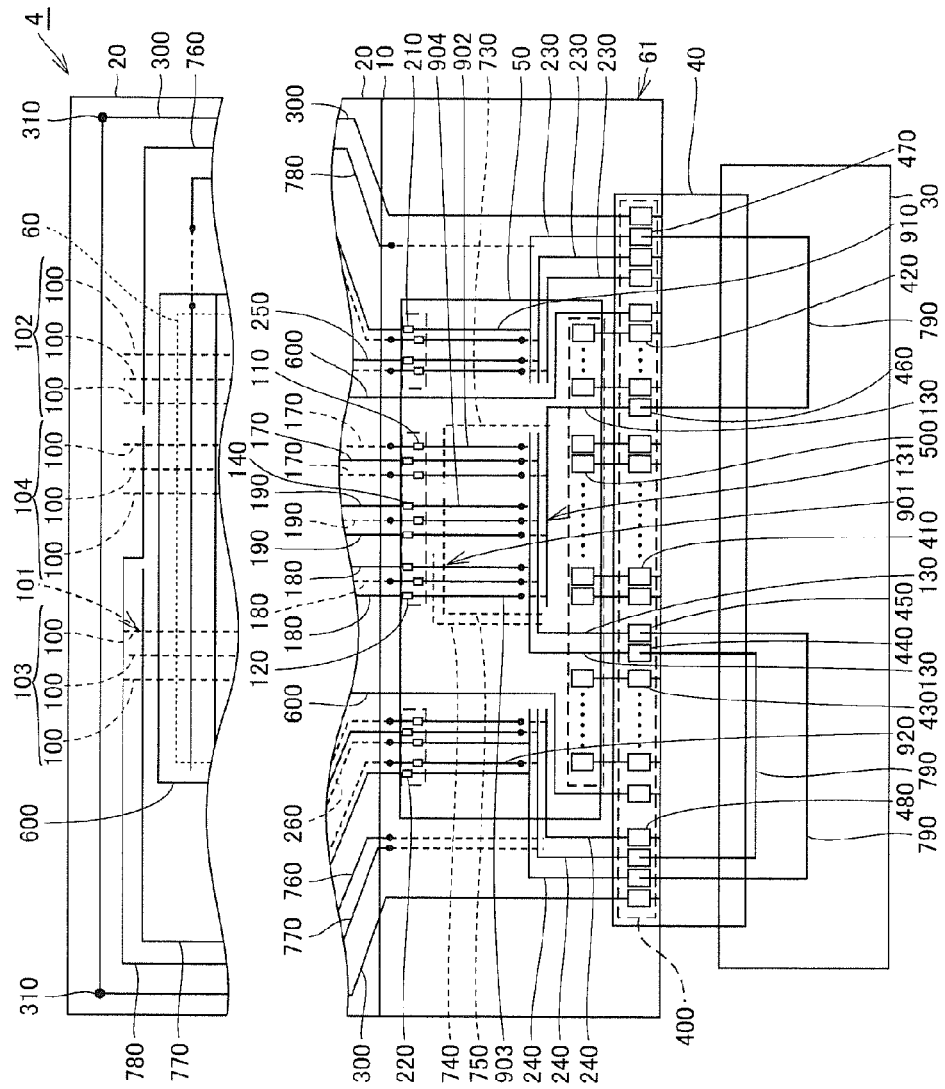
FIG. 10 is a partial plan view showing a configuration of an active matrix display device according to the same embodiment.

FIG. 9 is a plan view showing a configuration of an active matrix display device according to Embodiment 1 of the present invention. FIG. 10 is a partial plan view showing a configuration of an active matrix display device according to the present embodiment.

In FIGS. 9 and 10, wiring lines formed in the gate electrode layer of the TFTs are depicted with solid lines, and wiring lines formed in the source/drain electrode layer of the TFTs are depicted with dotted lines. FIGS. 9 and 10 show a state prior to forming obstructing portions. The obstructing portions are formed in a location similar to that of the active matrix display device 1 of Embodiment 1.

As shown in FIGS. 9 and 10, in an active matrix display device 4 according to Embodiment 3 of the present invention, a plurality of source wiring lines 100 are divided into three groups. Specifically, a right-side group of source wiring lines 102 located towards the right side of the drawing, a left-side group of source wiring lines 103, and a middle group of source wiring lines 104 located between the group of right-side source wiring lines 102 and the group of left-side source wiring lines 103 are provided.

The plurality of source wiring lines 100 included in the right-side group of source wiring lines 102 are respectively connected to a plurality of right-side first lead-out wiring lines 170. The plurality of right-side first lead-out wiring lines 170 are respectively connected to the plurality of right-side source terminals 110.

The plurality of source wiring lines 100 included in the left-side group of source wiring lines 103 are respectively connected to a plurality of left-side first lead-out wiring lines 180. The plurality of left-side first lead-out wiring lines 180 are respectively connected to the plurality of left-side source terminals 120.

The plurality of source wiring lines 100 included in the middle group of source wiring lines 104 are respectively connected to a plurality of middle first lead-out wiring lines 190. The plurality of middle first lead-out wiring lines 190 are respectively connected to the plurality of middle source terminals 140.

The plurality of first connecting wiring lines 900 includes a right-side group of first connecting wiring lines 902 located to the right, a left-side group of first connecting wiring lines 903 located to the left, and a middle group of first connecting wiring lines 904 located between the right-side group of first connecting wiring lines 902 and the left-side group of first connecting wiring lines 903.

The plurality of first auxiliary wiring lines 700 include a right-side first auxiliary wiring line 730 located to the right, a left-side auxiliary wiring line 740 located to the left, and a middle first auxiliary wiring line 750 located between the right-side first auxiliary wiring line 730 and the left-side first auxiliary wiring line 740.

The right-side first auxiliary wiring line 730, the left-side first auxiliary wiring line 740, and the middle first auxiliary wiring line 750, after extending in the extension direction of the plurality of source wiring lines 100 from the respective extension portions 131 of the three first common wiring lines 130 that intersect therewith, change direction and extend in the extension direction of the plurality of gate wiring lines 200.

The right-side first auxiliary wiring line 730 intersects only with the right-side group of first connecting wiring lines 902. In other words, the right-side first auxiliary wiring line 730 does not intersect with the left-side group of first connecting wiring lines 903 or the middle group of first connecting wiring lines 904.

The left-side first auxiliary wiring line 740 intersects only with the left-side group of first connecting wiring lines 903. In other words, the left-side first auxiliary wiring line 740 does not intersect with the right-side group of first connecting wiring lines 902 or the middle group of first connecting wiring lines 904.

The middle first auxiliary wiring line 750 intersects with the left-side group of first connecting wiring lines 903 and the middle group of first connecting wiring lines 904. In other words, the middle first auxiliary wiring line 750 does not intersect with the right-side group of first connecting wiring lines 902.

The second auxiliary wiring line 760 intersects only with the plurality of source wiring lines 100 included in the right-side group of source wiring lines 102 in the redundant portion 101.

Of the third auxiliary wiring lines, the right-side third auxiliary wiring line 770 located to the right intersects only with the plurality of source wiring lines 100 included in the left-side group of source wiring lines 103 in the redundant portion 101. Of the third auxiliary wiring lines, the left-side third auxiliary wiring line 780 located to the left intersects only with the plurality of source wiring lines 100 included in the middle group of source wiring lines 104 in the redundant portion 101.

In the present embodiment, the number of intersections 901 between the plurality of first auxiliary wiring lines 700 and the plurality of first connecting wiring lines 900 can be reduced. Also, the number of intersections between the second auxiliary wiring line 760, the right-side third auxiliary wiring line 770, the left-side third auxiliary wiring line 780, and the plurality of source wiring lines 100 can be reduced. As a result, the load capacity of the repair paths can be reduced, and waveform rounding in the signals flowing through the repair paths can be reduced.

It is possible to have a reduced area for the wiring lines in the present embodiment compared to the active matrix display device 1 of Embodiment 1 in which the length of the extension portions 131 of the plurality of first auxiliary wiring lines 700 are substantially the same, and in which the second auxiliary wiring line 710 and the third auxiliary wiring line 720 intersects with the redundant portions 101 of all source wiring lines 100. As a result, the outer form of the panel can be made smaller, and a wide laser radiation area can be ensured in the step of cutting.

Below, an active matrix display device of Embodiment 4 of the present invention will be explained. In the description of the embodiment below, descriptions of configurations similar to Embodiment 1 will be omitted.

(Embodiment 4)

Figure 11:
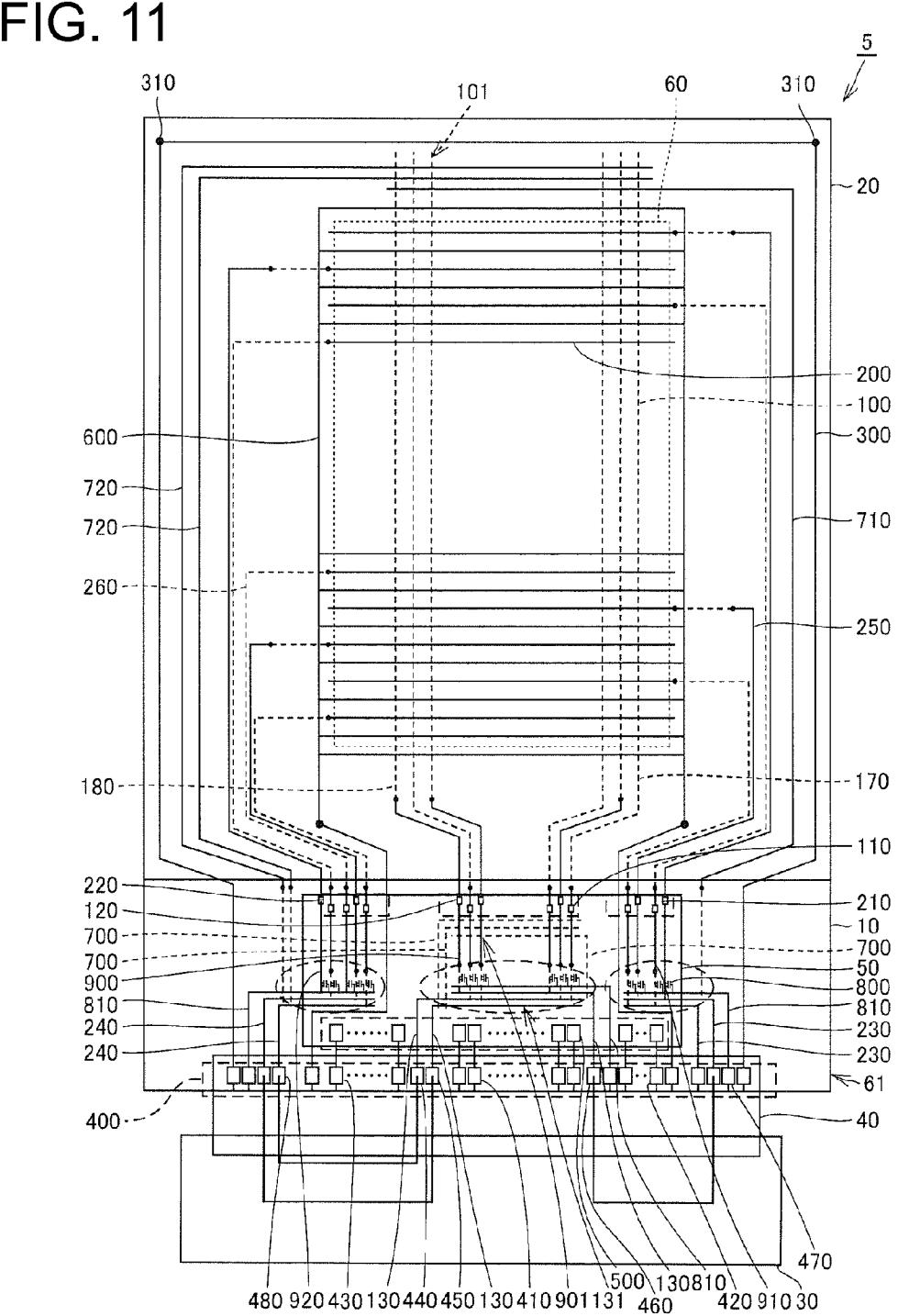
FIG. 11 is a plan view showing a configuration of an active matrix display device according to Embodiment 4 of the present invention.
Figure 12:
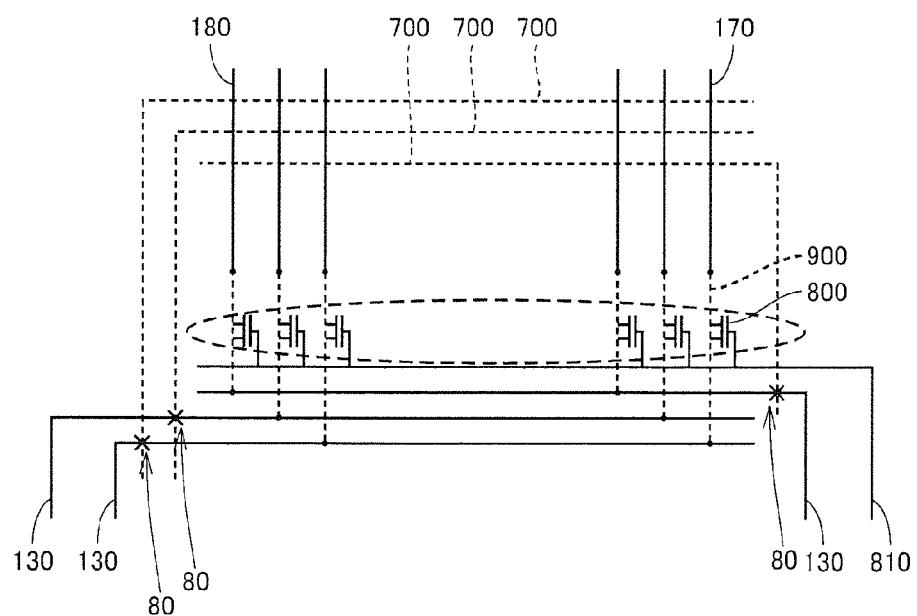
FIG. 12 is a magnified plan view showing a configuration of obstructing portions of the same embodiment.

FIG. 11 is a plan view showing a configuration of an active matrix display device according Embodiment 4 of the present invention. FIG. 12 is a magnified plan view showing a configuration of obstructing portions of the present embodiment. In FIGS. 11 and 12, wiring lines formed in the gate electrode layer of the TFTs are depicted with solid lines, and wiring lines formed in the source/drain electrode layer of the TFTs are depicted with dotted lines.

As shown in FIGS. 11 and 12, in an active matrix display device 5 of Embodiment 4 of the present invention, switching elements 800 formed in the middle of each of the plurality of first connecting wiring lines 900 serve as obstructing portions. The plurality of switching elements 800 are connected to switching wiring lines 810.

In a step of image testing, it is possible to perform testing of the display screen of a liquid crystal panel by supplying a test signal by putting a probe into contact with any of the plurality of first common wiring line terminals 440, 450, and 460 while inputting a signal to the switching wiring lines 810 that would put the plurality of switching elements 800 in the ON state.

After testing, a signal may be inputted to the switching wiring lines 810 that puts the plurality of switching elements 800 in the OFF state. In such a case, it is possible to mitigate leaks between source wiring lines 100 through the switching elements 800.

Thus, in a step of repair, as shown in FIG. 12, it is preferable that an intersection between the first common wiring line 130 and the first auxiliary wiring line 700 serve as a target 80 to be irradiated with the laser beam, instead of electrically connecting the switching wiring line 810 to the first auxiliary wiring line 700.

In the active matrix display device 5 of the present embodiment, there is no need to radiate a laser beam in a line in the step of repair, and thus, repairs can be performed with ease.

The embodiments disclosed herein are examples in every respect and are not limiting. The scope of the present invention is defined by the claims, and all modifications with the same meaning as the claims and within the scope defined thereby are included.

DESCRIPTION OF REFERENCE CHARACTERS 1, 2, 3, 4, 5 active matrix display device
10 active matrix substrate
20 opposite substrate
30 circuit substrate
50 driver
51 right-side driver circuit
52 left-side driver circuit
53 right-side driver circuit signal wiring line
54 left-side driver circuit signal wiring line
60 display region
61 terminal region
70 disconnection
80 target
91 disconnected portion
100 source wiring line
101 redundant portion
102 right-side group of source wiring lines
103 left-side group of source wiring lines
104 middle group of source wiring lines
110 right-side source terminal
120 left-side source terminal
130 first common wiring line
130B blue subpixel common wiring line
130G green subpixel common wiring line
130R red subpixel common wiring line
131 extension portion
140 middle source terminal
170, 180, 190 first lead-out wiring line
200 gate wiring line
210 right-side gate terminal
220 left-side gate terminal
230 second common wiring line
240 third common wiring line
250 second lead-out wiring line
260 third lead-out wiring line
300 common electrode wiring line
310 transfer pad
400 group of terminals
410, 420, 430, 471, 481 input terminal
440, 450, 460 first common wiring line terminal
470 second common wiring line terminal
480 third common wiring line terminal
490 auxiliary wiring line terminal
500 output terminal
600 auxiliary capacitance wiring line
700, 730, 740, 750 first auxiliary wiring line
710, 760 second auxiliary wiring line
720, 770, 780 third auxiliary wiring line
790 external auxiliary wiring line
800 switching element
810 switching wiring line
900 first connecting wiring line
901 intersection
902, 903, 904 group of first connecting wiring lines
910 second connecting wiring line
920 third connecting wiring line

The invention claimed is:

1. An active matrix display device, comprising:
an active matrix substrate;
a driver mounted on the active matrix substrate; and
an external substrate electrically connected to the active matrix substrate;
wherein the active matrix substrate includes:
a plurality of first wiring lines that extend in parallel with each other in at least a display region;
a plurality of second wiring lines that extend in parallel with each other in the display region, and that intersect with the plurality of first wiring lines across an insulating film;
a plurality of first transmission terminals located in a terminal region towards the display region, the terminal region being located outside the display region on one end of the plurality of first wiring lines, the plurality of first transmission terminals being aligned in an extension direction of the plurality of second wiring lines and sending signals from the driver to the respective plurality of first wiring lines;

a plurality of first lead-out wiring lines that respectively connect one end of the plurality of first wiring lines to the plurality of first transmission terminals;

a plurality of second lead-out wiring lines connected to one end of at least some of the plurality of second wiring lines;

a first driver circuit that is electrically connected to the plurality of second lead-out wiring lines, and that supplies signals to said at least some of the plurality of second wiring lines;

a plurality of output terminals located in the terminal region opposite to where the display region is located, the plurality of output terminals outputting a signal to the driver;

a group of terminals located in the terminal region closer to an edge thereof opposite to where the display region is located than the plurality of output terminals, the group of terminals including a plurality of input terminals to which a signal from the external substrate is inputted;

a first common wiring line terminal included in the group of terminals by which a signal is inputted, the signal passing through the plurality of first transmission terminals;

a first common wiring line connected to the first common wiring line terminal, the first common wiring line having an extension portion that extends between the plurality of first transmission terminals and the plurality of output terminals so as to separate the plurality of first transmission terminals from the plurality of output terminals;

a plurality of connecting wiring lines provided between the respective plurality of first transmission terminals and the extension portion of the first common wiring line;

a first auxiliary wiring line that intersects with the first common wiring line across the insulating film, and that intersects with any of the plurality of connecting wiring lines across the insulating film; and a second auxiliary wiring line that intersects with any of a plurality of redundant portions that are portions on another end of the plurality of first wiring lines opposite to said one end of the plurality of first wiring lines across the insulating film and that are located outside of the display region, the second auxiliary wiring line being located outside of where the plurality of second lead-out lines and the first driver circuit are located in a plan view, the second auxiliary wiring line being able to be electrically connected to any of input terminals included in the group of terminals, wherein the external substrate has an external auxiliary wiring line that connects the first common wiring line terminal to an input terminal that can be connected to the second auxiliary wiring line among the plurality of input terminals included in the group of terminals, wherein the plurality of connecting wiring lines respectively have obstructing portions therein that obstruct electrical connections between the plurality of first transmission terminals and the first common wiring line, and wherein a plurality of intersections where the first auxiliary wiring line and the plurality of connecting wiring lines intersect are located in each of the plurality of connecting wiring lines closer to the plurality of first transmission terminals than the obstructing portions are.

2. The active matrix display device according to claim 1, wherein the active matrix substrate further includes:

a plurality of third lead-out wiring lines connected to another end opposite to said one end thereof of at least some of the remaining plurality of second wiring lines that are not connected to the plurality of second lead-out wiring lines;

a second driver circuit that is electrically connected to the plurality of third lead-out wiring lines, and that supplies signals to said at least some of the remaining plurality of second wiring lines; and a third auxiliary wiring line that intersects with any of the plurality of redundant portions across the insulating film, the third auxiliary wiring line being located outside of where the plurality of third lead-out wiring lines and the second driver circuit are located in a plan view, the third auxiliary wiring line being able to be electrically connected to any of the input terminals included in the group of terminals, and wherein the external substrate further includes an external auxiliary wiring line that can connect the first common wiring line terminal to an input terminal that can connect to the third auxiliary wiring line among the plurality of input terminals included in the group of terminals.

3. The active matrix display device according to claim 1, wherein the active matrix substrate has a plurality of said first common wiring line terminals and a plurality of said first common wiring lines, and wherein the plurality of first common wiring lines are respectively connected to the plurality of first common wiring line terminals, the first common wiring lines each having the extension portion that extends between the plurality of first transmission terminals and the plurality of output terminals so as to separate the plurality of first transmission terminals from the plurality of output terminals.

4. The active matrix display device according to claim 1, wherein the active matrix substrate has a plurality of said first auxiliary wiring lines.

5. The active matrix display device according to claim 4, wherein the active matrix substrate further includes:

a plurality of second transmission terminals located in a terminal region towards the display region, the terminal region being located outside the display region on one end of the plurality of first wiring lines, the plurality of second transmission terminals being aligned in an extension direction of the plurality of second wiring lines and sending signals from the driver to the respective plurality of second wiring lines; and a second common wiring line by which a signal is inputted, the signal passing through the plurality of second transmission terminals connected to the plurality of second lead-out wiring lines among the plurality of second transmission terminals, wherein the second auxiliary wiring line is connected to the second common wiring line or intersects therewith across the insulating film.

6. The active matrix display device according to claim 1, wherein the obstructing portion is configured by providing a disconnected portion in each of the plurality of connecting wiring lines.

7. The active matrix display device according to claim 1, wherein the obstructing portion is configured by providing a switching element in each of the plurality of connecting wiring lines.

8. The active matrix display device according to claim 1,
wherein three of said first common wiring line terminals are provided,
wherein three of the first common wiring lines respectively connected to the three first common wiring line terminals are provided, and
wherein the plurality of first wiring lines are electrically connected to any of the three first common wiring lines.

9. The active matrix display device according to claim 1, wherein the first driver circuit is monolithically formed on the active matrix substrate.

10. The active matrix display device according to claim 1,
wherein the connecting wiring line connected to a first wiring line having a disconnection among the plurality of first wiring lines is electrically connected to the first auxiliary wiring line that intersects with the connecting wiring line by removing a portion of the insulating film interposed therebetween,
wherein the first auxiliary wiring line electrically connected to the connecting wiring line is electrically connected to the first common wiring line that intersects with the first auxiliary wiring line by removing a portion of the insulating film interposed therebetween,
wherein the first common wiring line terminal connected to the first common wiring line that is electrically connected to the first auxiliary wiring line is connected by the external auxiliary wiring line to any of the input terminals included in the group of terminals,
wherein an input terminal connected by the external auxiliary wiring line to the first common wiring line terminal is connected to the second auxiliary wiring line,
wherein the second auxiliary wiring line electrically connected to the first common wiring line terminal is electrically connected to any of the plurality of redundant portions by removing a portion of the insulating film interposed therebetween, and
wherein a signal from the driver inputted from the first transmission terminals is sent to both one end and another end of the first wiring line among the plurality of first wiring lines that is electrically connected to the connecting wiring line connected to the first auxiliary wiring line.

11. The active matrix display device according to claim 1, wherein the active matrix substrate further includes:
a plurality of third lead-out wiring lines connected to another end of at least some of the remaining plurality of second wiring lines that are not connected to the plurality of second lead-out wiring lines;
a second driver circuit connected to the plurality of third lead-out wiring lines;
a third auxiliary wiring line that intersects with any of the plurality redundant portions across the insulating film, the third auxiliary wiring line being located outside of where the plurality of third lead-out wiring lines and the second driver circuit are located in a plan view, the third auxiliary wiring line being able to be electrically connected to any of the input terminals included in the group of terminals;
a plurality of second transmission terminals located in a terminal region towards the display region, the terminal region being located outside the display region on one end of the plurality of first wiring lines, the plurality of second transmission terminals being aligned in an extension direction of the plurality of second wiring lines and sending signals from the driver to the respective plurality of second wiring lines; and
a third common wiring line by which a signal is inputted, the signal passing through the plurality of second transmission terminals connected to the plurality of third lead-out wiring lines among the plurality of second transmission terminals,
wherein the external substrate further includes an external auxiliary wiring line that connects the first common wiring line terminal to an input terminal that can connect to the third auxiliary wiring line among the plurality of input terminals included in the group of terminals, and
wherein the third auxiliary wiring line is connected to the third common wiring line or intersects therewith across the insulating film.

12. The active matrix display device according to claim 11,
wherein the external substrate has a plurality of said external auxiliary wiring lines,
wherein the plurality of external auxiliary wiring lines can be connected respectively to a plurality of said first common wiring line terminals, and
wherein the active matrix substrate includes in the group of terminals a plurality of input terminals that can connect the plurality of first common wiring line terminals that can be respectively connected to the plurality of external auxiliary wiring lines to at least one of the second auxiliary wiring line and the third auxiliary wiring line.

13. The active matrix display device according to claim 11,
wherein the connecting wiring line connected to a first wiring line having a disconnection among the plurality of first wiring lines is electrically connected to the first auxiliary wiring line that intersects with the connecting wiring line by removing a portion of the insulating film interposed therebetween,
wherein the first auxiliary wiring line electrically connected to the connecting wiring line is electrically connected to the first common wiring line that intersects with the first auxiliary wiring line by removing a portion of the insulating film interposed therebetween,
wherein the first common wiring line terminal connected to the first common wiring line that is electrically connected to the first auxiliary wiring line is connected by the external auxiliary wiring line to any of the input terminals included in the group of terminals,
wherein a terminal connected to the first common wiring line terminal by the external auxiliary wiring line is connected to the second auxiliary wiring line or the third auxiliary wiring line,
wherein the second auxiliary wiring or the third auxiliary wiring line that is electrically connected to the first common wiring line terminal is electrically connected to any of the plurality of redundant portions by removing a portion of the insulating film interposed therebetween, and
wherein a signal from the driver inputted from the first transmission terminals is sent to both one end and another end of the first wiring line among the plurality of first wiring lines that is electrically connected to the connecting wiring line connected to the first auxiliary wiring line.

14. The active matrix display device according to claim 11, wherein the second driver circuit is monolithically formed on the active matrix substrate.

15. The active matrix display device according to claim 11, wherein at least one of the first driver circuit and the second driver circuit is formed in the driver.

16. The active matrix display device according to claim 11, wherein the second auxiliary wiring line and the third auxiliary wiring line are connected to the plurality of redundant portions so as not to overlap the plurality of redundant portions or intersects with the plurality of redundant portions.

\* \* \* \* \*